United States Patent
Schmid et al.

(10) Patent No.: US 12,278,529 B2
(45) Date of Patent: Apr. 15, 2025

(54) WINDING MAT AND COIL MAT COMPRISING THE SAME AS WELL AS ELECTRIC MACHINE COMPONENT FORMED THEREWITH AND METHOD OF MANUFACTURING THE SAME

(71) Applicant: GROB-WERKE Gmbh & Co. KG, Mindelheim (DE)

(72) Inventors: Frederik Schmid, Altenstadt (DE); Ralf Rauscher, Fellheim (DE)

(73) Assignee: GROB-WERKE GMBH & CO. KG, Mindelheim (DE)

( * ) Notice: Subject to any disclaimer, the term of this patent is extended or adjusted under 35 U.S.C. 154(b) by 874 days.

(21) Appl. No.: 16/976,355

(22) PCT Filed: Feb. 27, 2019

(86) PCT No.: PCT/DE2019/100178
§ 371 (c)(1),
(2) Date: Aug. 27, 2020

(87) PCT Pub. No.: WO2019/166060
PCT Pub. Date: Sep. 6, 2019

(65) Prior Publication Data
US 2021/0006139 A1    Jan. 7, 2021

(30) Foreign Application Priority Data

Feb. 28, 2018  (DE) .......................... 102018001553.0
Dec. 5, 2018   (DE) .......................... 102018009460.0

(51) Int. Cl.
*H02K 15/04*     (2006.01)
*H02K 3/12*      (2006.01)

(52) U.S. Cl.
CPC .......... *H02K 15/0478* (2013.01); *H02K 3/12* (2013.01); *Y10T 29/49071* (2015.01)

(58) Field of Classification Search
CPC ................ H02K 3/04–14; H02K 3/38; H02K 3/50–505; H02K 15/0025–005

(Continued)

(56) References Cited

U.S. PATENT DOCUMENTS 6,882,077 B2    4/2005  Neet
7,005,772 B1 *  2/2006  Frederick ................ H02K 3/28
                                                    310/179

(Continued)

FOREIGN PATENT DOCUMENTS

DE    10359863 A1     7/2004
DE    102004056811 A1  6/2005

(Continued)

OTHER PUBLICATIONS

International Search Report; priority document.

*Primary Examiner* — Thomas Truong
*Assistant Examiner* — Minki Chang
(74) *Attorney, Agent, or Firm* — Greer, Burns & Crain, Ltd.

(57) ABSTRACT

A winding mat formed as a flat winding and to coil mat formed from it for producing a coil winding for an electric machine. To be able to manufacture different coil mats also with layer swap and conductor swap in an automated manner and in large series and with a high degree of reliability, it is proposed to join wave winding wires by plugging. To produce the coil mat, it is proposed, among other things, to join two individual mats by plugging the mats together.

11 Claims, 18 Drawing Sheets

(58) Field of Classification Search
USPC .......................................... 310/195, 203, 207
See application file for complete search history.

(56) References Cited

U.S. PATENT DOCUMENTS

| | | |
|---|---|---|
| 8,393,072 B2 | 3/2013 | Bodin et al. |
| 2009/0322178 A1 | 12/2009 | Dobashi et al. |
| 2011/0173800 A1* | 7/2011 | Akimoto .................. H02K 3/28 |
| | | 29/596 |
| 2012/0112595 A1 | 5/2012 | Watanabe et al. |
| 2017/0324286 A1* | 11/2017 | Akimoto ............ H02K 15/0478 |
| 2017/0324294 A1 | 11/2017 | Schulz et al. |

FOREIGN PATENT DOCUMENTS

| | | |
|---|---|---|
| DE | 60125436 A1 | 10/2007 |
| DE | 102014111803 A1 | 2/2015 |
| DE | 112006000742 A1 | 4/2016 |
| DE | 112015005047 T5 | 8/2017 |
| DE | 102017127634 A1 | 12/2017 |
| EP | 1974443 B1 | 1/2012 |
| JP | 2002176752 A | 6/2002 |
| WO | 2006067298 A1 | 6/2006 |
| WO | 2006107993 A1 | 10/2006 |
| WO | 2007080353 A1 | 7/2007 |
| WO | 2016072480 A1 | 5/2016 |
| WO | 2016139430 A1 | 9/2016 |

* cited by examiner

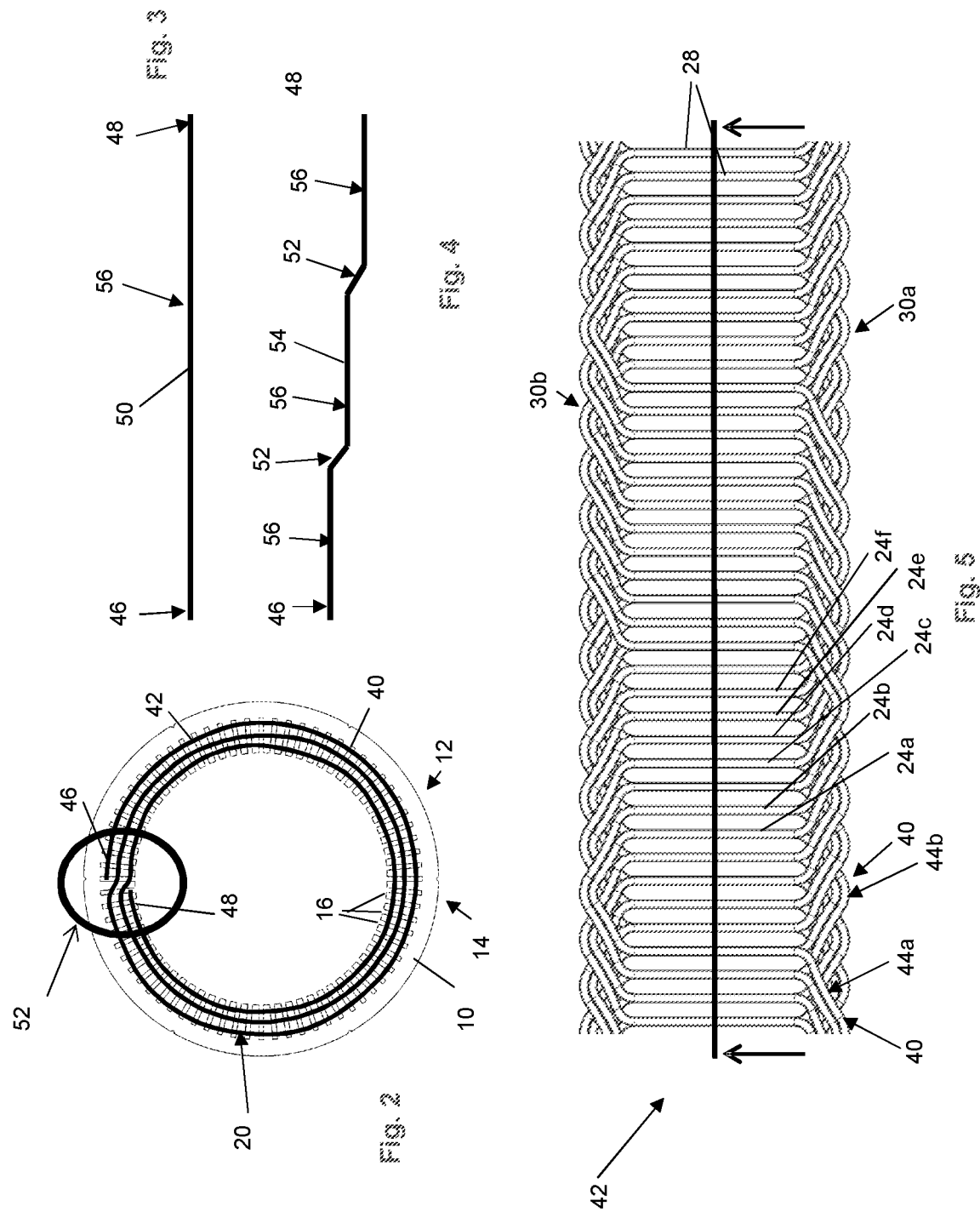

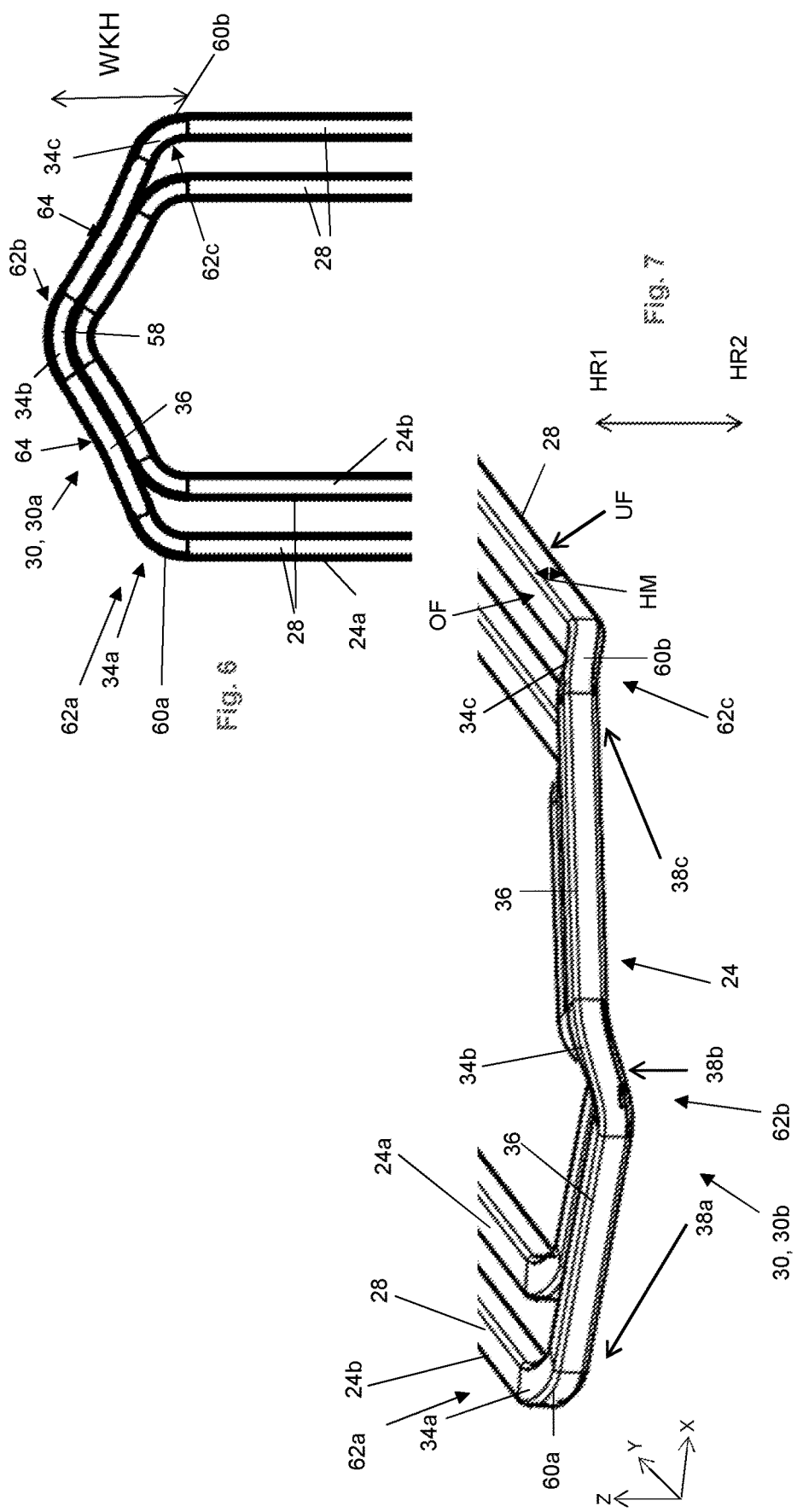

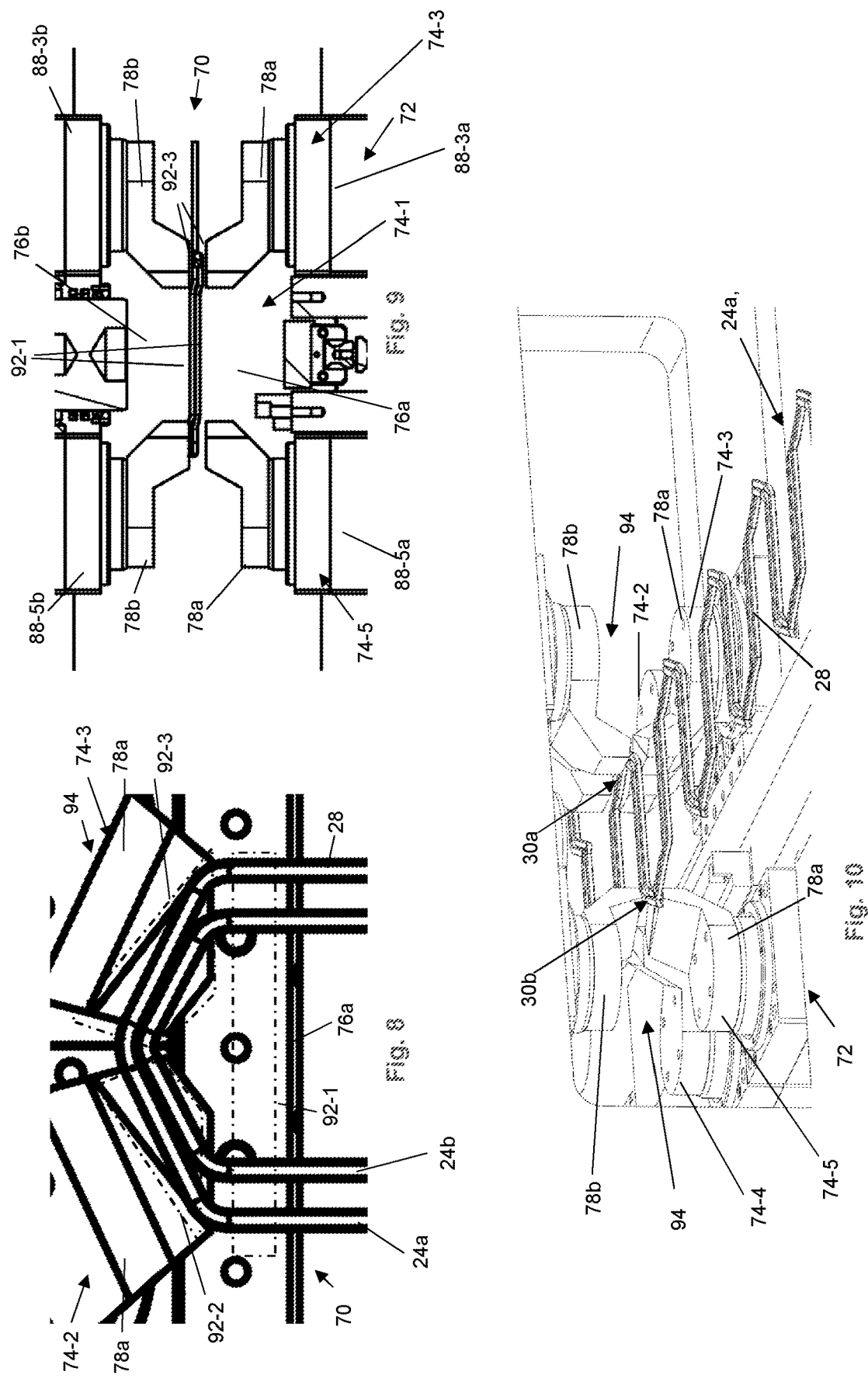

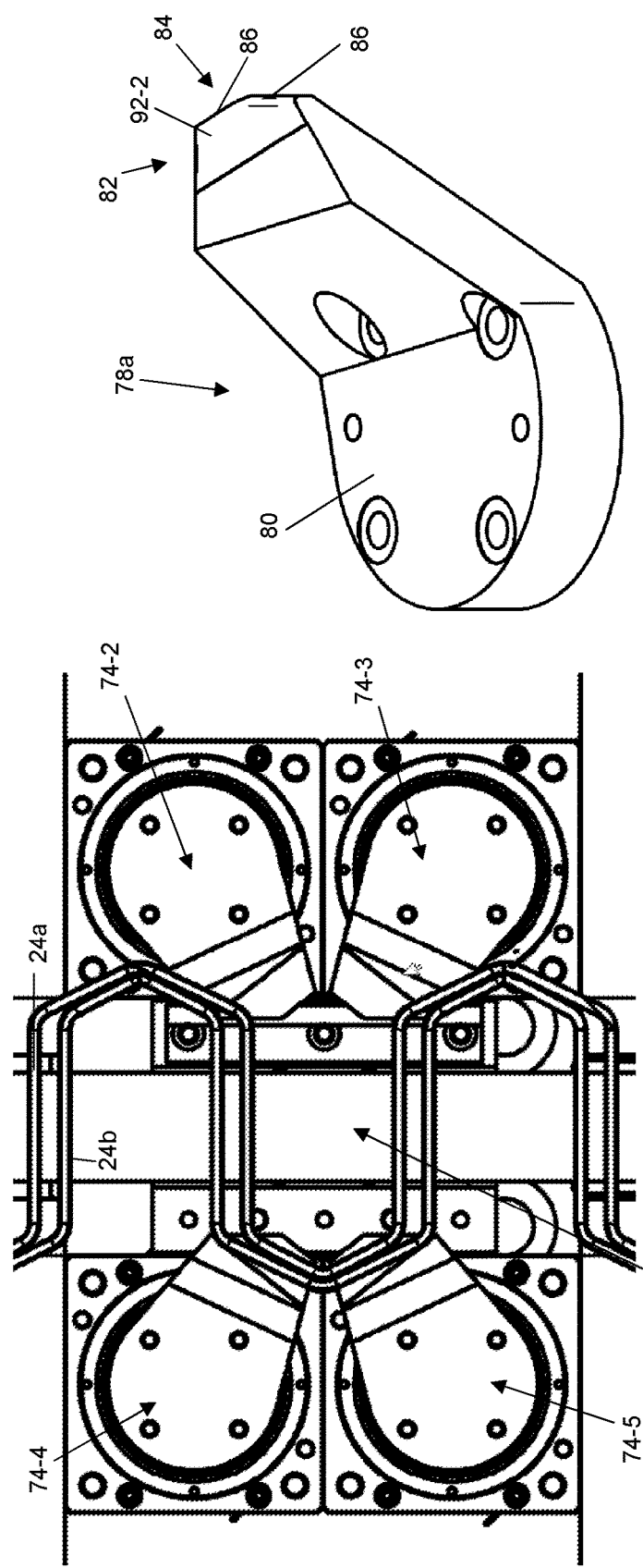

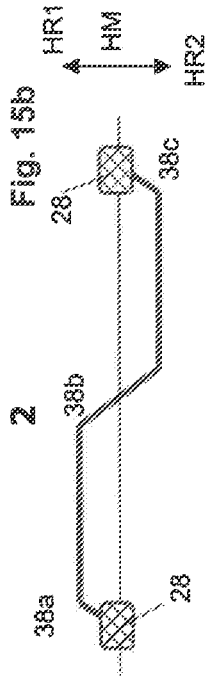
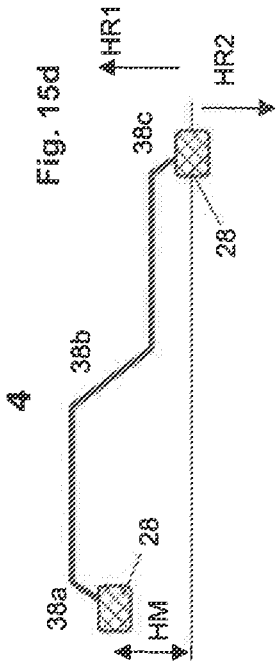
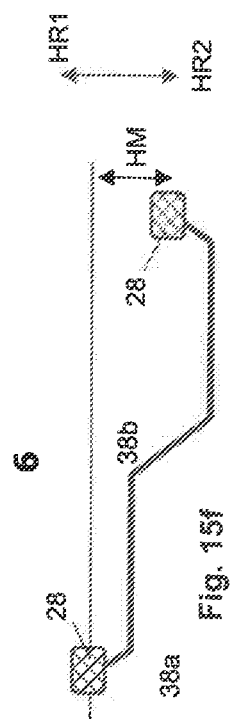
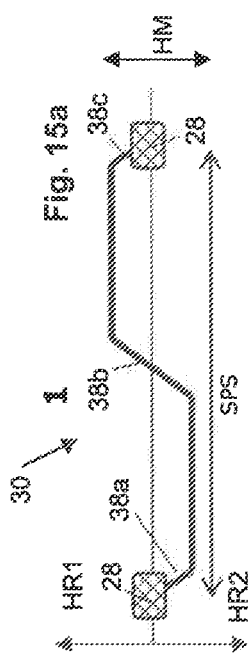
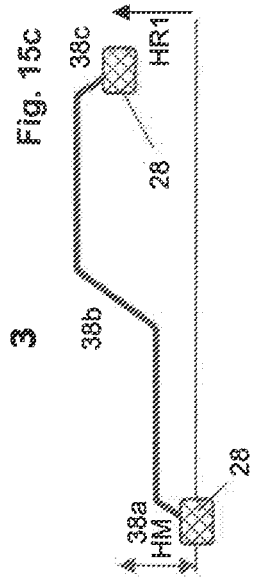
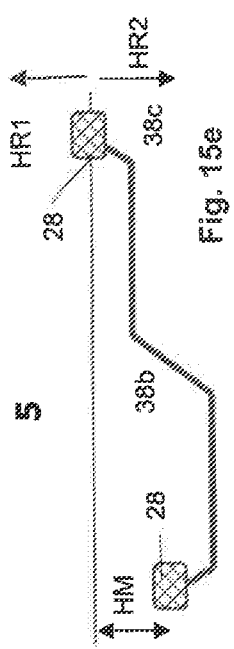

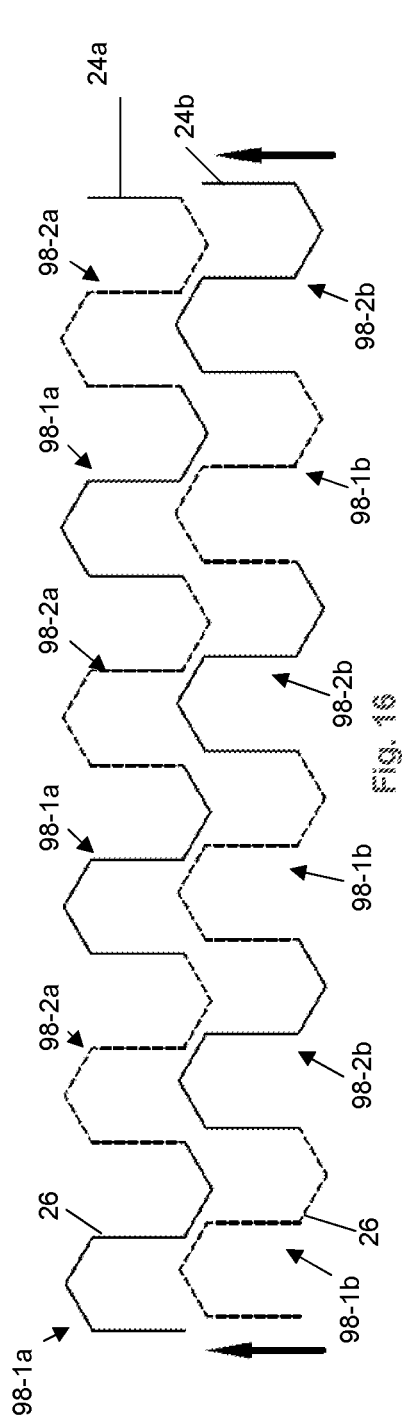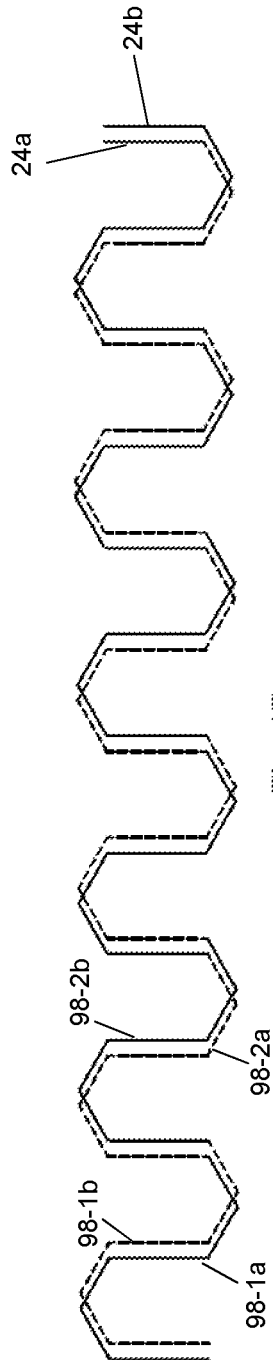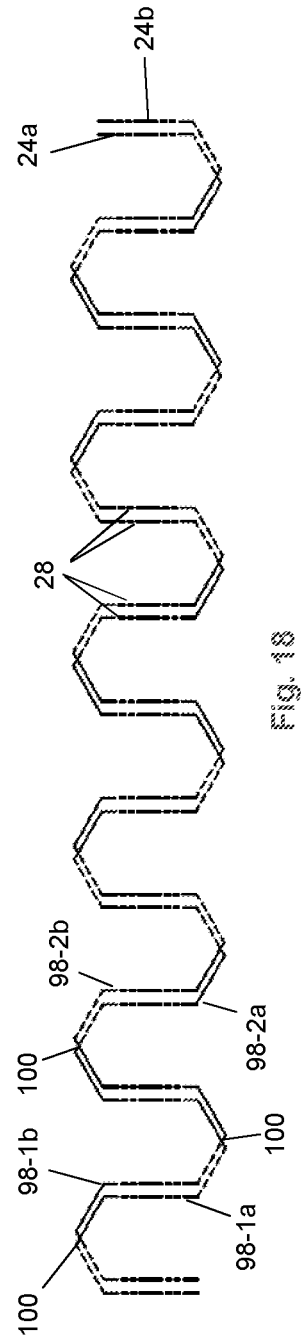

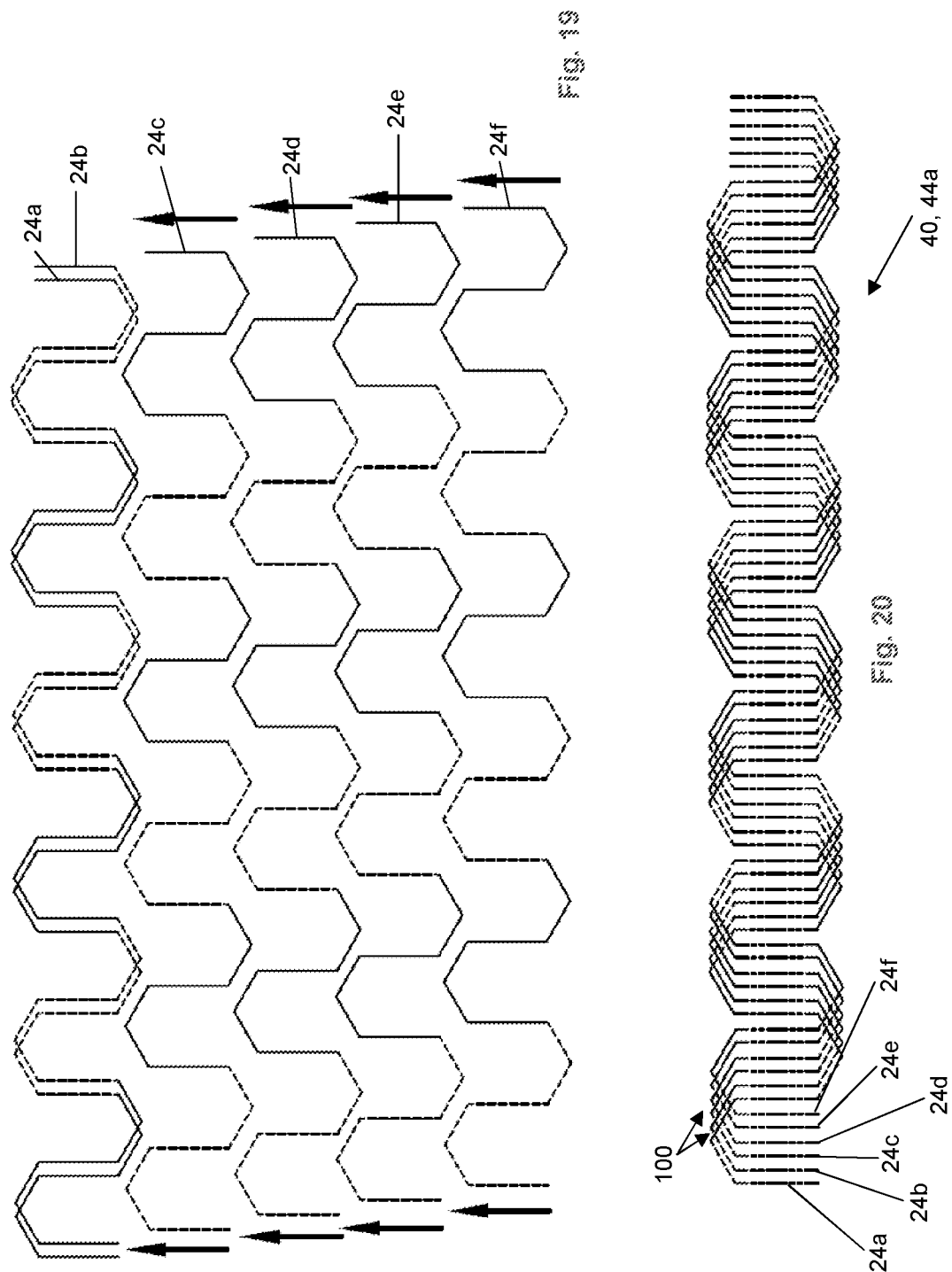

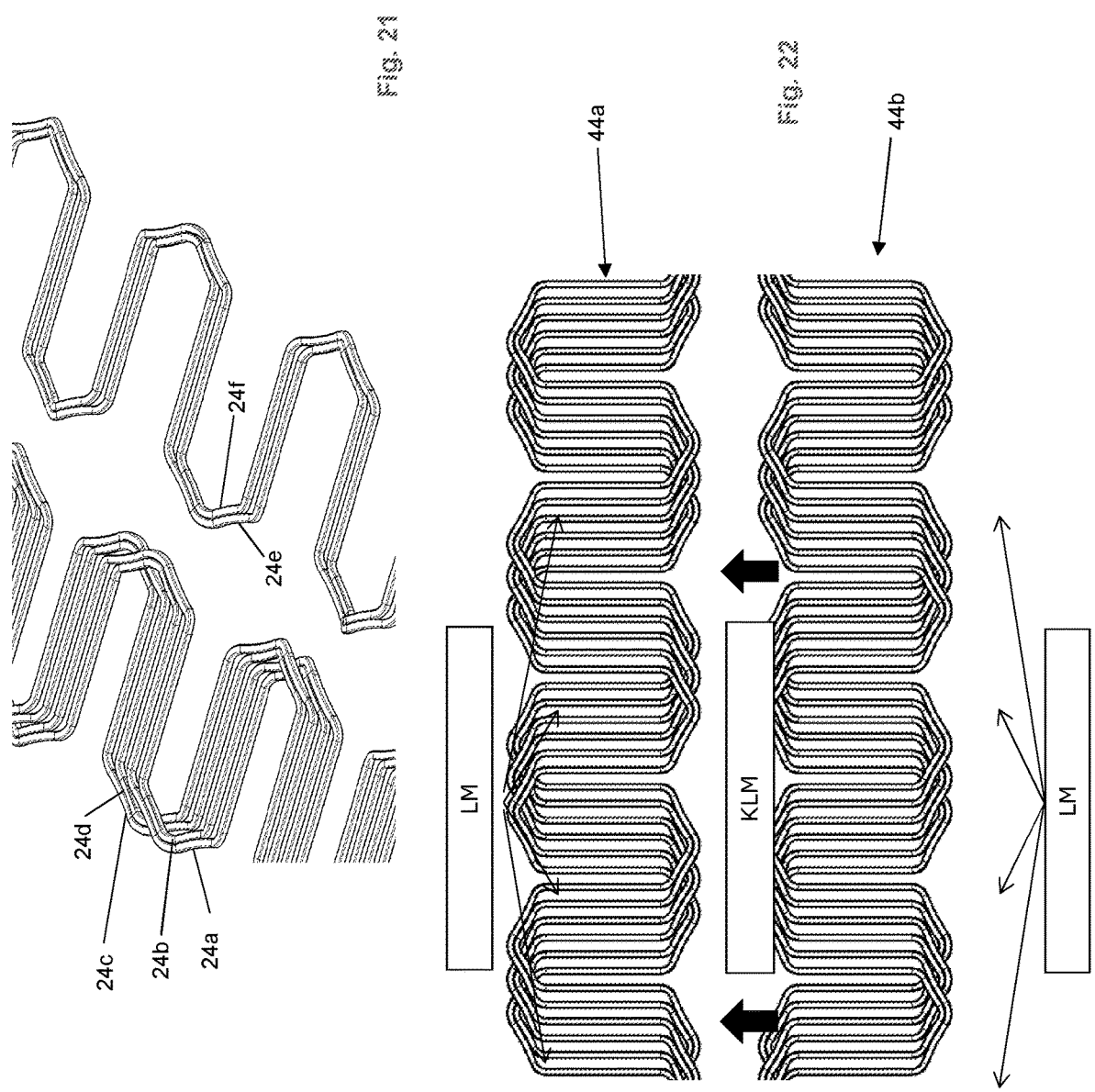

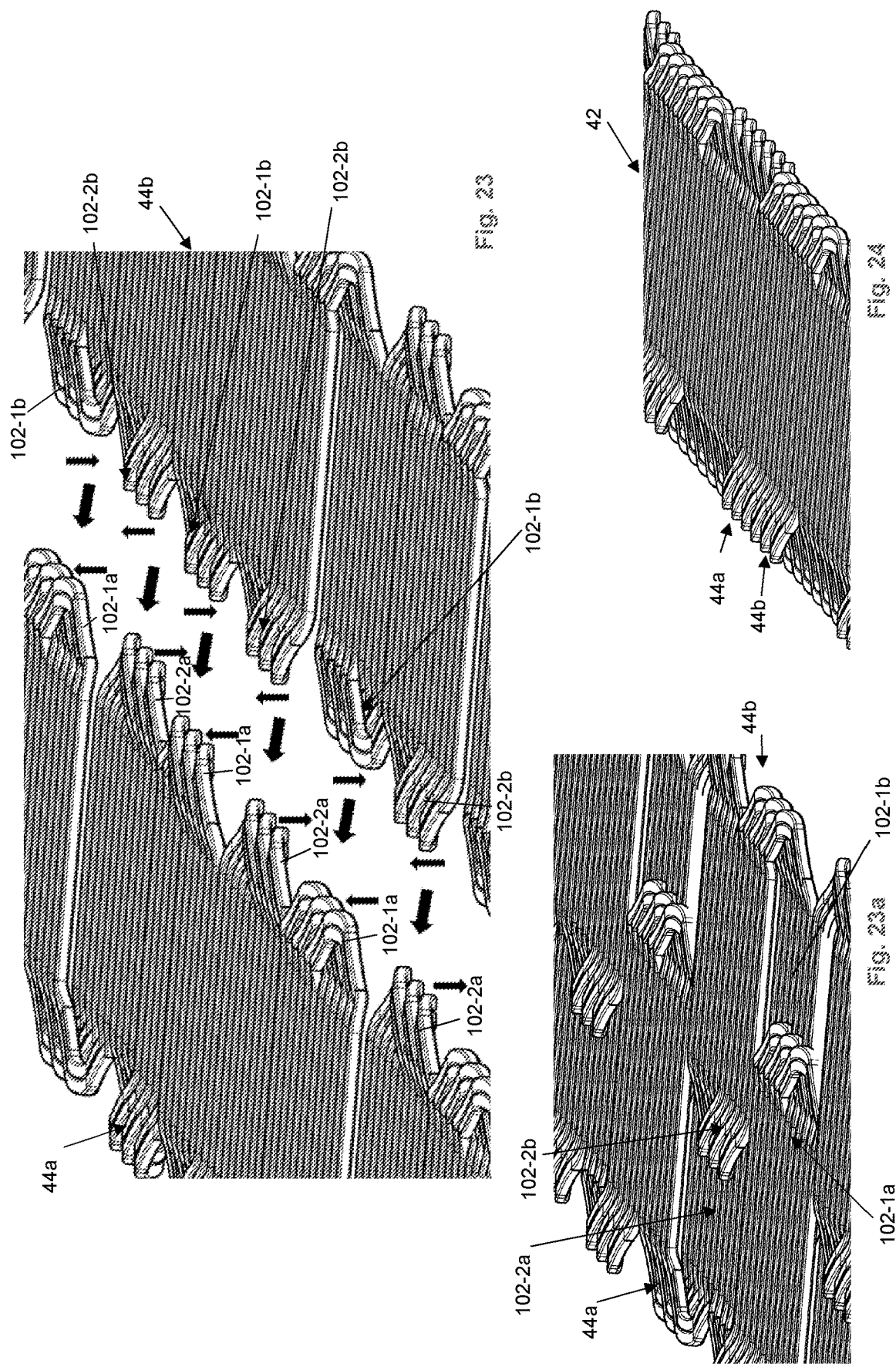

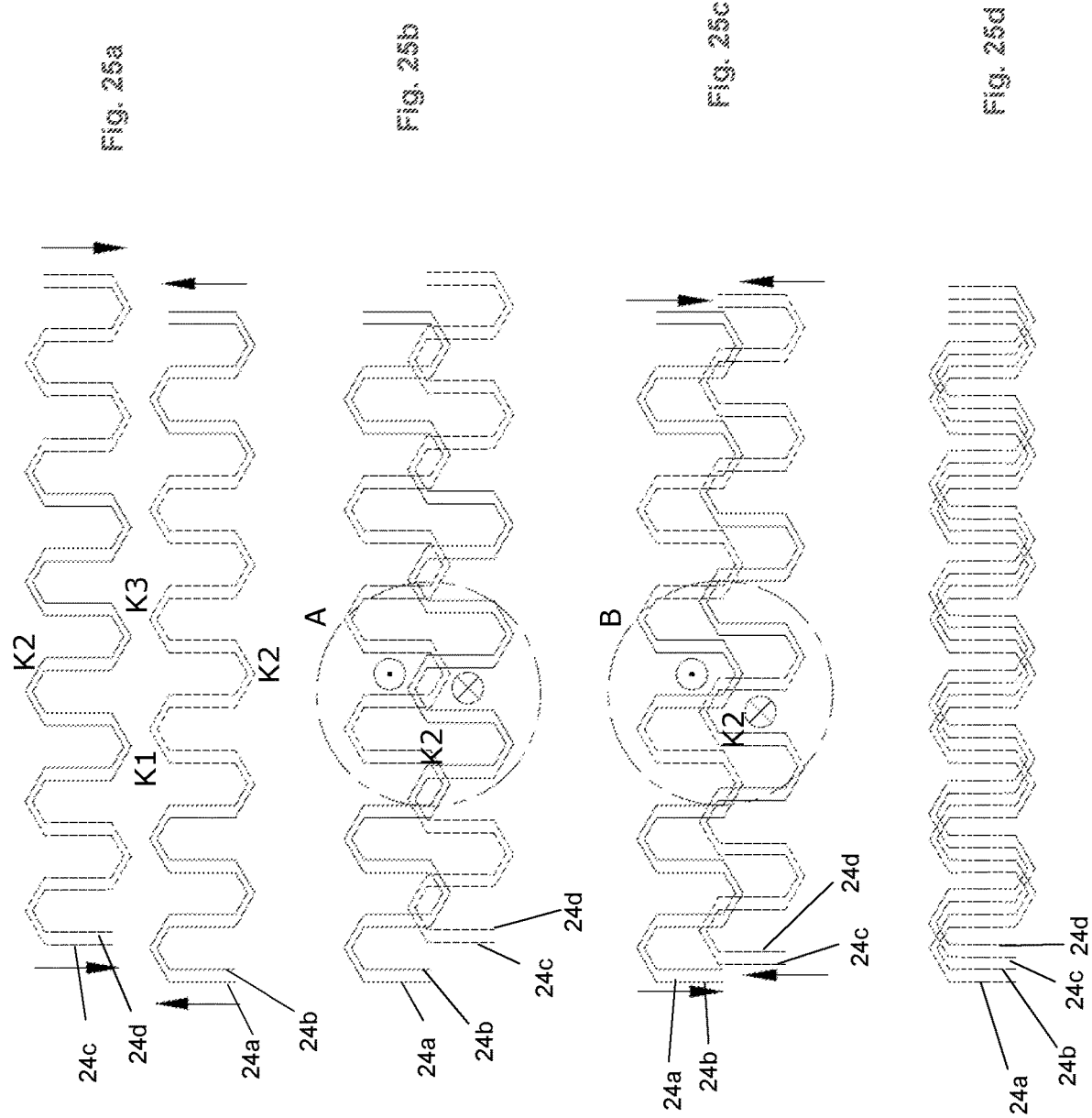

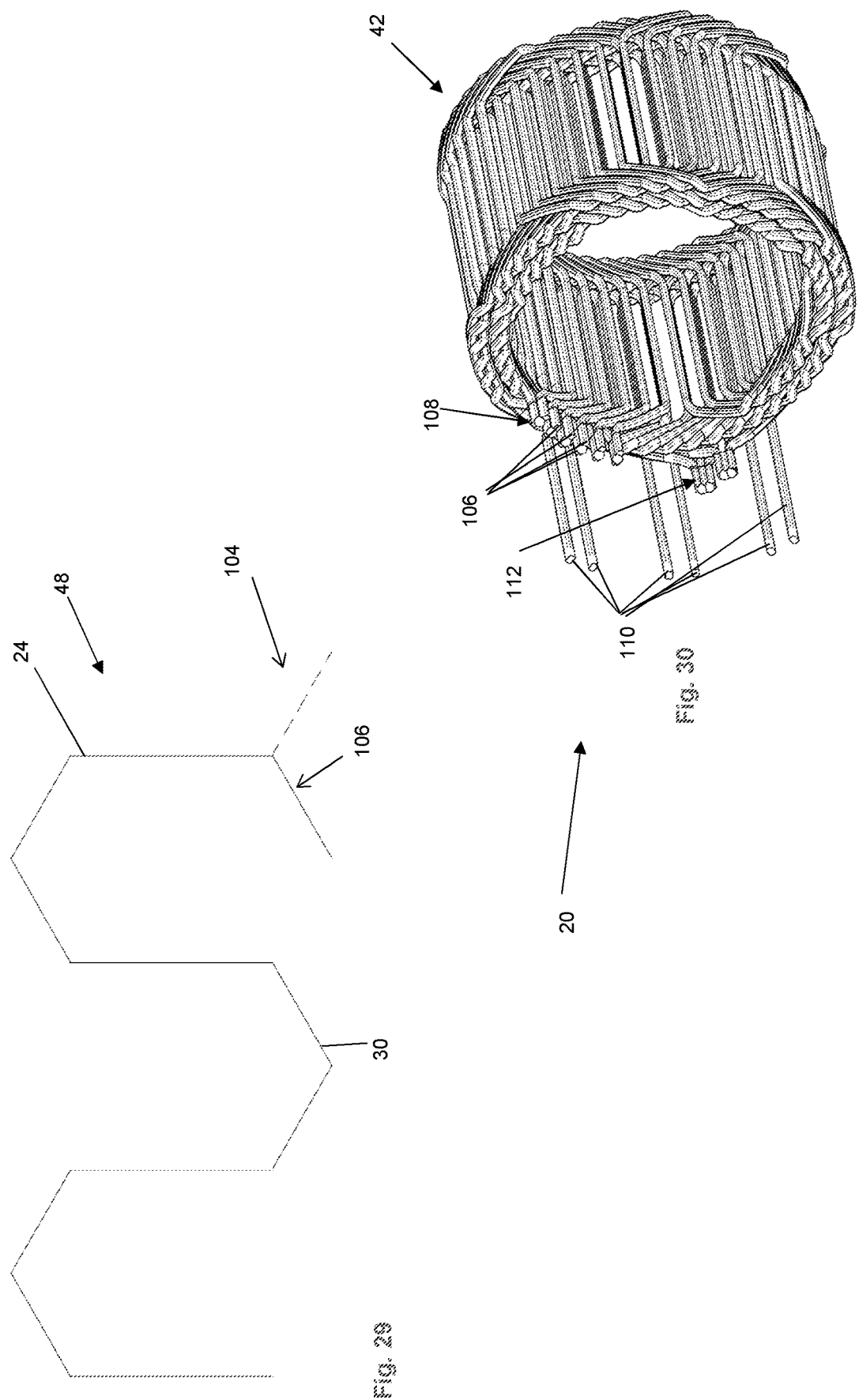

WINDING MAT AND COIL MAT COMPRISING THE SAME AS WELL AS ELECTRIC MACHINE COMPONENT FORMED THEREWITH AND METHOD OF MANUFACTURING THE SAME

CROSS-REFERENCES TO RELATED APPLICATIONS

This application claims the benefit of the International Application No. PCT/DE2019/100178, filed on Feb. 27, 2019, and of the German patent application No. 102018001553.0 filed on Feb. 28, 2018, and of the German patent application No. 102018009460.0 filed on Dec. 5, 2018, the entire disclosures of which are incorporated herein by way of reference.

FIELD OF THE INVENTION

The invention relates to a wave winding mat composed of wave winding wires. In the following, such a wave winding mat is simply referred to as a winding mat. The invention further relates to a coil mat composed of a first individual mat formed as a winding mat and a second individual mat formed as a winding mat. The invention further relates to a component of an electric machine, such as a stator of an electric motor, having a component body and a coil winding supported thereon, the coil winding being formed from a winding mat or coil mat wound up in several layers. The invention also relates to a winding mat manufacturing method for manufacturing such a wave mat and to a coil mat manufacturing method for manufacturing such a coil mat.

BACKGROUND OF THE INVENTION

The invention relates to winding mats composed of wave winding wires for manufacturing a coil winding of an electric machine and their manufacture. A winding mat is understood to be a mat-shaped conductor bundle formed from several wave winding wires (conductors). Wave winding wires are wires bent in a wave shape. The bend in one plane can be achieved by bending successive wire sections in opposite bending directions. This production method is particularly advantageous for profile wires having a cross-sectional profile shape that deviates from a round shape, for example a rectangular profile. The windings from wave winding wires and winding mats are different from so-called sword windings in which a coil winding is created by winding the winding wires on an elongate rectangular form (sword), and from the resulting (sword) winding mats in that the wires are not bent spirally or helically, but are bent flat. A winding mat comprises, in particular, several wave winding wires extending in a longitudinal direction and bent in a wave shape. Said wave winding wires have straight wire sections spaced apart in the longitudinal direction and extending in a transverse direction running transversely to the longitudinal direction, and intermediate roof-shaped winding heads such that adjacent straight wire sections are connected to each other by a winding head bent in a roof shape.

The straight wire sections of the winding mat are specifically intended to be inserted into slots of a housing of an electric machine component, such as, in particular, a stator of an electric motor. The winding heads each make a turnaround and protrude on the outside of the axially directed ends of the housing, connecting the wire section of one slot to a wire section in another slot. All in all, the coil winding of the component of the electrical machine can thus be formed by one or preferably several winding mats. For example, a three-phase coil winding is to be produced.

In the following, some terms which are used in the description of the invention and its advantageous designs and also in the discussion of the technological background will be explained in more detail with reference to the illustrations in FIGS. 34 and 35. FIGS. 34 and 35 show a simplified representation of a sub-segment of a housing 10 of a stator 14 with slots 16 and a coil winding 20 formed from conductors A, B, the stator in this case being an exemplary component 12. FIG. 34 shows a single-layer winding where the conductors A and B remain in one plane, and FIG. 35 shows a two-layer winding where the conductors A and B swap plane.

Coil step/coil width: The "coil step" SPS specifies by how many slots 16 a single conductor A, B jumps per turnaround. The average coil step SPS of coil the winding 20 is called "coil width". The coil step and the coil width may differ, for example, if two single conductors of the same phase run parallel. In FIG. 34, it can be seen that conductor B has a coil step SPS of five. The outer conductor A jumps seven slots. This gives a coil width of six.

Shift measure: The "shift measure" is the dimension of the coil width. This is diameter-dependent, since the circumferential distance between the slots 16 of the stator 14 increases as the diameter increases. If a winding mat has several turns in the stator 14, it has several shift measures, but a constant coil width.

Zone width: The "zone width" indicates the number of slots from which a winding scheme is repeated. If the coil step is constant, the "zone width" corresponds to the coil width. If the coil step SPS changes each time at a coil width of six, the scheme is repeated after the second turnaround. This gives a zone width of twelve.

Conductor swap: If, as in FIG. 35, two conductors A, B a winding scheme has these differences in the coil step, one speaks of a winding with "conductor swap". If one looks at the sequence of the conductors A, B in FIG. 34 in the circumferential direction, one can see that always two conductors are swapped (AB→BA).

Layer swap: If two conductors A, B swap planes in the slot 16 or in a winding mat, this is called "layer swap". At the point where the conductors A, B swap plane, they have a jump 22. A winding mat without layer swap is also called a "single-layer winding mat", a winding mat with layer swap is called a "two-layer winding mat". Swapping the layers can also compensate for potential differences in the conductors which would result from a different distance between the two layers and another component of the electrical machine, such as the rotor.

WO2016/072480 A1 and the corresponding DE 11 2015 005047 A1 describe a flat-wound interlaced winding mat with layer swap at several points, produced by interlacing/twisting into each other, where a layer swap can never occur directly after six slots, but can occur after twelve, eighteen, twenty-four slots, etc. A layer swap is possible on both sides of the core stack—housing of the stator. There are two winding head shapes of the winding heads with mirrored height offsets and with sections in the winding head displaced upwards and downwards. This means that the winding heads fit into each other when rolled up.

From JP 2002 176 752 A and the corresponding DE 601 25 436 A1, a winding mat is known designed as a sword winding mat created from individual wires wound in a sword winding style and used to form a coil winding of a stator of an electric motor, which coil winding is executed by sword winding and thus has no wave winding wires. A winding head shape of the winding heads with two flat winding head sections and one jump is described.

DE 10 2004 056 811 A1 describes a winding mat connected in parallel, with continuous layer swap.

DE 10 2014 111 803 A1 describes a stepped winding mat with a conductor swap at the stair.

WO 2016/139 430 A1 describes a slot assignment for a winding mat. The winding mat is introduced in several steps.

U.S. Pat. No. 6,882,077 A describes a general winding mat having winding heads with two inclined elements and one jump.

WO 2006/107 993 A1 and the corresponding DE 11 2006 000 742 A1 describe a winding mat with a coil step of 5-7 in one plane and a winding comprising six conductors. At least 50% of the jumps of 5-7 of the coil steps are in one layer and two conductors are in parallel.

WO 2007/080353 A1 (corresponds to U.S. Pat. No. 8,393,072 A and EP 1 974 443 A1) discloses a winding mat with layer swap, but without conductor swap, hence without a coil step of 5-7. To create the winding mat, individual wires or individual winding mats must be interlaced.

WO 2006/067298 A1 describes different winding schemes of flat-wound mats with a coil width of 6.

DE 103 59 863 A1 describes the variation of a winding head height with jumps in the winding head.

WO2016/072480 A1 and the corresponding DE 11 2015 005 047 A1 describe a winding head shape also having three bend points and with different jump heights.

DE 11 2006 000 742 A1 describes a winding head shape having two bend points and equal jump heights.

SUMMARY OF THE INVENTION

The invention is based on an object of providing a winding mat and a coil mat formed from this winding mat, which can be produced more easily in large series in an automatic manufacturing process than previously and from which a coil winding of an electrical machine can be produced more easily and with increased reliability.

According to a first aspect, the invention provides a winding mat for forming a coil winding of a component of an electric machine, comprising several wave winding wires extending (in an elongate manner) in a longitudinal direction and bent in a wave shape, said wave winding wires having straight wire sections longitudinally spaced apart and extending in a transverse direction running transversely to the longitudinal direction, and intermediate roof-shaped winding heads such that adjacent straight wire sections are connected to each other by a winding head bent in a roof-shaped manner to form a half-wave section in such a manner that first half-wave sections with first winding heads bent in a first direction and second half-wave sections with second winding heads bent in an opposite second direction are alternately provided and a first half-wave section and an adjacent second half-wave section respectively form a wave section, wherein the wave winding wires are not interlaced or twisted, but are joined together by plugging the wave winding wires together in the transverse direction to one another in such a way that at at least one insertion region of the winding mat, a first and an adjacent second sub-section of the one wave winding wire and a first and an adjacent second sub-section of the other wave winding wire are plugged into each other in such a way that the first sub-section of the one wave winding wire is plugged-in under the first sub-section of said other wave winding wire and the second sub-section of the one wave winding wire is plugged-in over the second sub-section of the other wave winding wire.

It is preferred that the winding heads each have a central roof bend and a transition bend in the transition region to the associated straight wire sections and a counter-bend between the transition bends and the roof bend.

According to a first variant, it is preferred that the winding mat is designed in a flat manner with a uniform extension in height direction over the entire length.

According to a second variant, it is preferred that the winding mat is designed stepped in a stair-like manner, where at least one transition region forms a step in the height direction and the transition region preferably forms a plug-in region.

It is preferred that a start region and/or an end region of the winding mat form the at least one plug-in region where the or at least two of the wave winding wires are plugged into each other.

It is preferred that the or at least two of the wave winding wires are plugged into each other at a start region of the winding mat and/or at an end region of the winding mat and are stacked in at least one intermediate region.

It is preferred that one pair or a group of wave winding wires are respectively plugged into another pair or group of wave winding wires.

It is preferred that only a subgroup of wave winding wires are inserted into each other in the winding mat and remaining wave winding wires are stacked.

It is preferred that each wave winding wire in the straight wire sections has a wire thickness which, measured in a height direction running transversely to the longitudinal direction and transversely to the transverse direction, extends over a wire thickness dimension.

It is preferred that each winding head has a first height offset by half a height extension dimension at a first winding head section connecting to a first straight wire section, a second height offset by a full height extension dimension at a second winding head section connecting to the first winding head section, and a third height offset by half a height extension dimension at a third winding head section extending between the second winding head section and a second straight wire section.

It is preferred that the height extension dimension is equal to the wire thickness dimension or equal to the wire thickness dimension plus a predetermined tolerance.

Preferably, the height extension dimension is dependent on the wire thickness. In particular, the height dimension is dependent on the wire thickness dimension. Preferably, the height extension dimension results from the wire thickness plus a tolerance that takes into account a play/clearance to the wire below/next to it as well as other distances selected for design reasons. The height extension dimension indicates how high the jump in the winding heads is. The tolerance by which the height extension dimension is greater than the wire thickness dimension, is preferably much smaller than the wire thickness dimension and is, for example, in a range of 0.001% to 5% of the wire thickness. Preferably, typical tolerance values are taken into account in the tolerance such that adjacent wires lie on each other without tension and there is preferably a small clearance between adjacent wires lying on each other.

It is further preferred that at least one standard region is provided where the first height offset is directed in a first height direction, the second height offset is directed in the opposite second height direction, and the third height offset is directed in the first height direction at each winding head.

It is further preferred that in a transition region of a winding mat according to the second variant, at least one winding head where the first height offset is directed in the first height direction, the second height offset is directed in the first direction, and the third height offset is directed in the second direction, and at least one winding head where the first height offset is directed in the second height direction, the second height offset is directed in the second height direction, and the third height offset is directed in the first height direction, are provided at each of the wave winding wires.

It is further preferred that in a start region and/or end region of the winding mat, at least one winding head is provided in each case at the wave winding wires, where
- the first height offset is directed in the first height direction, the second height offset is directed in the second height direction, and the third height offset is directed in the first height direction or
- the first height offset is directed in the second height direction, the second height offset is directed in the first height direction, and the third height offset is directed in the first height direction.

According to a further aspect, the invention provides a coil mat for forming a coil winding of a component of an electric machine, the coil mat comprising a first individual mat having 3n1 individual wave winding wires, where n1 is a natural number greater than 0, and a second individual mat having 3n2 individual wave winding wires, where n2 is a natural number greater than 0, the wave winding wires comprising straight wire sections spaced apart in the longitudinal direction of the coil mat and extending in a transverse direction running transversely to the longitudinal direction, and intermediate roof-shaped winding heads such that adjacent straight wire sections are connected to each other by a winding head bent in a roof-shaped manner and thus form half-wave sections in such a manner that first half-wave sections with first winding heads bent in a first direction and second half-wave sections with second winding heads bent in an opposite direction are alternately provided and a first half-wave section and an adjacent second half-wave section respectively form a wave section, wherein
- a) at least one of the individual mats is a winding mat according to one of the above designs and/or
- b) the individual mats are not interlaced or twisted, but are joined together by plugging the individual mats together in the transverse direction to each other in such a way that at at least one insertion region of the coil mat, a first and an adjacent second sub-section of the one individual mat and a first and an adjacent second sub-section of the other individual mat are plugged into each other in such a way that the first sub-section of the one individual mat is pushed under the first sub-section of the other individual mat and the second sub-section of the one individual mat is pushed over the second sub-section of the other individual mat.

It is preferred that in the straight sections, each wave winding wire has a wire thickness which, measured in a height direction running transversely to the longitudinal direction and transversely to the transverse direction, extends over a wire thickness dimension, and that each winding head has a first height offset by half a height extension dimension at a first winding head section connecting to a first straight wire section, a second height offset by a full height extension dimension at a second winding head section connecting to the first winding head section, and a third height offset by half a height extension dimension at a third winding head section extending between the second winding head section and the second straight wire section, the height extension dimension being equal to the wire thickness dimension or equal to the wire thickness dimension plus a predetermined tolerance.

It is preferred that the individual mats are stepped in a stair-like manner, with at least one transition region forming a step in the height direction,
- that the coil mat has a start region, several standard regions with a respective intermediate transition region, and an end region,
- that, when the coil mat is used as intended, the first height direction in the height offsets of the winding heads corresponds to a direction radially outwards and the second height direction corresponds to a direction radially inwards,
- that the winding heads have a winding head shape which is selected from a group of winding head shapes comprising:
- a first winding head shape where the first height offset is directed in the second height direction, the second height offset is directed in the first height direction and the third height offset is directed in the second height direction,
- a second winding head shape where the first height offset is directed in the first height direction, the second height offset is directed in the second height direction and the third height offset is directed in the first height direction,
- a third winding head shape where the first height offset is directed in the first height direction, the second height offset is directed in the first height direction and the third height offset is directed in the second height direction,
- a fourth winding head shape where the first height offset is directed in the first height direction, the second height offset is directed in the second height direction and the third height offset is directed in the second height direction,
- a fifth winding head shape where the first height offset is directed in the second height direction, the second height offset is directed in the first height direction and the third height offset is directed in the first height direction; and
- a sixth winding head shape where the first height offset is directed in the second height direction, the second height offset is directed in the second height direction and the third height offset is directed in the first height direction,
- and that winding heads with the first or the second winding head shape are provided in said standard regions and that at least some of the wave winding wires in the transition region have winding heads with the third and/or the fourth and/or the fifth and/or the sixth winding head shape.

It is preferred that the first and the second individual mats are stacked on one another and that
- in the first individual mat,
  - in the start region and in the standard regions, the winding heads have the second winding head shape; in the transition region, the winding heads of at least one wave winding wire or group of wave winding wires have the fourth winding head shape and the winding heads of at least one other wave winding wire or group of wave winding wires have the sixth wave winding shape; and at the end region, the winding heads of the at least one wave winding wire or group of wave winding wires have the fourth winding head shape; and in the second individual mat,
in the start region, the winding heads of at least one wave winding wire or group of wave winding wires have the fourth winding head shape; in the standard regions and in the end region, the winding heads have the first winding head shape; and in the transition region, the winding heads of the at least one wave winding wire or group of wave winding wires have the fourth winding head shape and the winding heads of at least one other wave winding wire or group of wave winding wires have the sixth wave winding shape.

It is preferred that the first and the second individual mats are stacked on one another and that in the first individual mat,
in the start region and in the standard regions, the winding heads have the first winding head shape; in the transition region, the winding heads of at least one wave winding wire or group of wave winding wires have the fifth winding head shape and the winding heads of at least one other wave winding wire or group of wave winding wires have the third wave winding shape; and at the end region, the winding heads of the at least one wave winding wire or group of wave winding wires have the fifth winding head shape;

and in the second individual mat,
in the start region, the winding heads of at least one wave winding wire or group of wave winding wires have the fifth winding head shape; in the standard region and in the end region, the winding heads have the second winding head shape; and in the transition region, the winding heads of the at least one wave winding wire or group of wave winding wires have the fifth winding head shape and the winding heads of at least one other wave winding wire or group of wave winding wires have the third wave winding shape.

It is preferred that the first and the second individual mats are stacked on one another and that in the first individual mat,
in the start region and in the standard regions, the winding heads have the first winding head shape; in the transition region, the winding heads of at least one wave winding wire or group of wave winding wires have the sixth winding head shape and the winding heads of at least one other wave winding wire or group of wave winding wires have the fourth wave winding shape; and at the end region, the winding heads of the at least one wave winding wire or group of wave winding wires have the sixth winding head shape;

in the second individual mat,
in the start region, the winding heads of at least one wave winding wire or group of wave winding wires have the sixth winding head shape; in the standard region and in the end region, the winding heads have the second winding head shape; and in the transition region, the winding heads of the at least one wave winding wire or group of wave winding wires have the sixth winding head shape and the winding heads of at least one other wave winding wire or group of wave winding wires have the fourth wave winding shape.

It is preferred that the first and the second individual mats are stacked on one another and that in the first individual mat,
in the start region and in the standard region, the winding heads have the second winding head shape; in the transition region, the winding heads of at least one wave winding wire or group of wave winding wires have the third winding head shape and the winding heads of at least one other wave winding wire or group of wave winding wires have the fifth wave winding shape; and at the end region, the winding heads of the at least one wave winding wire or group of wave winding wires have the third winding head shape; and in the second individual mat,
in the start region, the winding heads of at least one wave winding wire or group of wave winding wires have the third winding head shape; in the second standard regions and in the end region, the winding heads have the first winding head shape; and in the transition region, the winding heads of the at least one wave winding wire or group of wave winding wires have the third winding head shape and the winding heads of at least one other wave winding wire or group of wave winding wires have the fifth wave winding shape.

It is preferred that both the first individual mat and the second individual mat are winding mats according to one of the designs described above for the winding mat according to the invention and that the first and second individual mats are plugged into each other and that in the first individual mat,
in the start region, the winding heads of at least one wave winding wire or each wave winding wire of a group of wave winding wires have the sixth winding head shape; in the standard regions, the winding heads have the second winding head shape; in the transition region, the winding heads of the at least one wave winding wire or group of wave winding wires comprise a sequence of at least one third and at least two sixth winding head shapes and the winding heads of at least one other wave winding wire or group of wave winding wires comprise a sequence of at least one first and at least one fourth wave winding shape; and at the end region, the winding heads of the at least one wave winding wire or group of wave winding wires comprise a sequence of at least one third and at least one sixth winding head shape; and in the second individual mat,
in the start region, the winding heads of at least one wave winding wire or group of wave winding wires have the sixth winding head shape and the winding heads of another wave winding wire or group of wave winding wires have the third winding head shape; in the standard region, the winding heads have the first winding head shape; and in the transition region, the winding heads of the at least one wave winding wire or group of wave winding wires comprise a sequence of at least one second and at least one sixth winding head shape and the winding heads of at least one other wave winding wire or group of wave winding wires comprise a sequence of at least one sixth, at least one fourth and at least one third winding head shape; and in the end region, the winding heads of the at least one wave winding wire or group of wave winding wires have the second winding head shape and the winding heads of the other wave winding wire or group of wave winding wires have the sixth winding head shape.

It is preferred that both the first individual mat and the second individual mat are winding mats according to one of the designs described above for the winding mat according to the invention and that the first and second individual mats are plugged into each other and that
in the first individual mat,
in the start region, the winding heads of at least one wave winding wire or each wave winding wire of a group of wave winding wires have the third winding head shape, in the standard regions, the winding heads have the first winding head shape, in the transition region, the winding heads of the at least one wave winding wire or group of wave winding wires comprise a sequence of at least one sixth and at least two third winding head shapes and the winding heads of at least one other wave winding wire or group of wave winding wires comprise a sequence of at least one second and at least one fifth wave winding shape, and at the end region, the winding heads of the at least one wave winding wire or group of wave winding wires comprise a sequence of at least one sixth and at least one third winding head shape; and
in the second individual mat,
in the start region, the winding heads of at least one wave winding wire or group of wave winding wires have the third winding head shape and the winding heads of another wave winding wire or group of wave winding wires have the sixth winding head shape; in the standard regions, the winding heads have the second winding head shape; and in the transition region, the winding heads of the at least one wave winding wire or group of wave winding wires comprise a sequence of at least one first and at least one third winding head shape and the winding heads of at least one other wave winding wire or group of wave winding wires comprise a sequence of at least one third, at least one fifth and at least one sixth winding head shape; and in the end region, the winding heads of said one wave winding wire or group of wave winding wires have the first winding head shape and the winding heads of the other wave winding wire or group of wave winding wires have the third winding head shape.

It is preferred that the sub-sections of the individual mats plugged into each other are offset in height to each other.

According to a further aspect, the invention provides a component of an electric machine, the component comprising a component body and a coil winding supported thereon, which is formed by a winding mat wound up in multiple layers according to one of the designs described above or a coil mat according to one of the designs described above.

The component is preferably designed as a stator, the component body being an annular housing with radial slots in which the straight wire sections are accommodated.

According to another aspect, the invention relates to a winding mat manufacturing method for manufacturing a winding mat to form a coil winding of a component of an electric machine, the method comprising:
a) preparing several wave winding wires bent in a wave shape and extending in a longitudinal direction and having longitudinally spaced-apart straight wire sections extending in a transverse direction running transversely to the longitudinal direction, and intermediate roof-shaped winding heads such that adjacent straight wire sections are interconnected by a winding head bent in a roof shape to form a half-wave section in such a manner that first half-wave sections having first winding heads bent in a first direction and second half-wave sections having second winding heads bent in an opposite second direction are alternately provided and a first half-wave section and an adjacent second half-wave section respectively form a wave section,
b) joining the wave winding wires not by interlacing or twisting, but by plugging the wave winding wires into each other, comprising:
b1) arranging a first and a second wave winding wire side by side so that their straight wire sections are aligned with each other with a common directional component;
b2) arranging a first sub-section and an adjacent second sub-section of the first wave winding wire in such a way that the first sub-section is higher than the second sub-section, and arranging a first sub-section of the second wave winding wire opposite the first sub-section of the first wave winding wire in such a way that it can be pushed under the first sub-section of the first wave winding wire, and arranging a second sub-section of the second wave winding wire opposite the second section of the first wave winding wire in such a way that it can be pushed over the second sub-section of the first wave winding wire, and
b3) pushing the first wave winding wire and the second wave winding wire into each other in the direction of the directional component of the straight wire sections aligned with each other, the first sub-section of the second wave winding wire being pushed under the first sub-section of the first wave winding wire and the second sub-section of the second wave winding wire being pushed over the second sub-section of the first wave winding wire.

It is preferred that step a) includes:
a1) forming the winding heads by respectively creating a central roof bend and a transition bend in the transition region to the associated straight wire sections and a respective counter-bend between the transition bends and the roof bend.

It is preferred that step a) includes:
a2) preparing the wave winding wires having a wire thickness which, measured in a height direction running transversely to the longitudinal direction and transversely to the transverse direction at the straight wire sections, extends over a wire thickness dimension.

It is preferred that step a) includes:
a3) preparing wave winding wires having a rectangular cross-section.

It is preferred that step a) includes:
a4) preparing the first and second wave winding wires having winding heads designed to form crossover points, wherein at least a sub-section of at least one winding head of the first sub-section of the first wave winding wire which is designed to form a crossover point is higher than the straight wire sections connected by this winding head by a height extension corresponding to at least half a wire thickness, and a sub-section of the winding head of the first sub-section of the second wave winding wire which is designed to form a crossover point is lower than the straight wire sections connected by this winding head by a height extension corresponding to at least half a wire thickness and/or wherein at least a sub-section of at least one winding head of the second sub-section of the first wave winding wire which is designed to form a crossover point is lower than the straight wire sections connected by this winding head by a height extension corresponding to a least half a wire thickness, and a sub-section of the winding head of the second sub-section of the second wave winding wire which is designed to form a crossover point is higher than the straight wire sections connected by this winding head by a height extension corresponding to at least half a wire thickness.

It is preferred that step a) includes:

a5) performing step a2) and introducing height offsets into the winding heads by:

bending a first height offset by half a height extension dimension at a first winding head section which connects to a first straight wire section, bending a second height offset by a full height extension dimension at a second winding head section which connects to the first winding head section, and bending a third height offset by half a height extension dimension at a third winding head section which extends between the second winding head section and a second straight wire section.

Further preferably, the height extension dimension is chosen to be equal to the wire thickness dimension or more preferably equal to the wire thickness dimension plus a predetermined tolerance.

Preferably the height extension dimension is selected depending on the wire thickness. In particular, the height extension dimension is dependent on the wire thickness dimension. Preferably, the height extension dimension results from the wire thickness as well as a tolerance that takes into account a play/clearance to the wire below/next to it as well as other distances selected for design reasons. The height extension dimension indicates how high the jump in the winding heads is. The tolerance by which the height extension dimension is greater than the wire thickness dimension is preferably much smaller than the wire thickness dimension and is, for example, in a range of 0.001% to 5% of the wire thickness. Preferably, the typical tolerance values are taken into account in the tolerance dimension in such a way that adjacent wires lie on each other without tension and there is preferably a small clearance between adjacent wires lying on each other.

It is preferred that step a) includes:

a6) preparing 3n wave winding wires, n being a natural number greater than 0.

It is preferred that step a5) includes bending the respective height offset in a first height direction which when the winding mat is used as intended corresponds to a direction radially outwards with respect to a central axis of the component, or in an opposite second height direction which when the winding mat is used as intended corresponds to a direction radially inwards with respect to a central axis of the component.

It is preferred that step a5) further includes:

a5a) introducing the first height offset into the region of a transition bend and the third height offset into the region of the other transition bend and the second height offset into the region of the roof bend.

It is preferred that step a5) further includes:

a5b) forming the height offsets to form a winding head shape selected from a group of winding head shapes comprising:

a first winding head shape where the first height offset is directed in the second height direction, the second height offset is directed in the first height direction and the third height offset is directed in the second height direction, a second winding head shape where the first height offset is directed in the first height direction, the second height offset is directed in the second height direction and the third height offset is directed in the first height direction, a third winding head shape where the first height offset is directed in the first height direction, the second height offset is directed in the first height direction and the third height offset is directed in the second height direction, a fourth winding head shape where the first height offset is directed in the first height direction, the second height offset is directed in the second height direction and the third height offset is directed in the second height direction, a fifth winding head shape where the first height offset is directed in the second height direction, the second height offset is directed in the first height direction and the third height offset is directed in the first height direction, and a sixth winding head shape where the first height offset is directed in the second height direction, the second height offset is directed in the second height direction and the third height offset is directed in the first height direction.

It is preferred that step a5) further includes:

a5c) selecting at least one standard region situated between a start region and an end region of the winding mat and shaping each winding head in the standard region in such a way that the first height offset and the third height offset are directed in the same height direction and the second height offset is directed in the opposite height direction.

It is preferred that step a5) further includes:

a5d) selecting a transition region where the winding mat is to receive a step in the height direction to form a stair-like stepping of the winding mat, and forming winding heads in wave winding wires at the transition region in such a way that in at least one winding head at the first wave winding wire the first height offset is directed in the first height direction, the second height offset is directed in the first direction, and the third height offset is directed in the second direction, and in at least one winding head at the second wave winding wire the first height offset is directed in the second height direction, the second height offset is directed in the second height direction, and the third height offset is directed in the first height direction.

It is preferred that step a5) further includes:

a5e) shaping at least one winding head at at least one of the first or second wave winding wires at a start region or an end region of the winding mat in such a way that the first height offset is directed in the first height direction, the second height offset is directed in the second height direction, and the third height offset is directed in the first height direction or the first height offset is directed in the second height direction, the second height offset is directed in the first height direction, and the third height offset is directed in the first height direction.

It is preferred that at least some, several or all of the sub-sections in step b) are half-wave sections or wave sections or are each formed by a plurality of half-wave sections or wave sections.

It is preferred that the wave mat is produced stepped in a stair-like manner, with at least one transition region forming a step in the height direction, wherein in step b), the sub-sections of the first and the second wave winding wires are plugged into each other in the transition region.

It is preferred that in step b) the sub-sections of the first and the second wave winding wires are plugged into each other in a start region and/or an end region of the wave mat.

It is preferred that the first and the second wave winding wire with their first and second sub-sections are plugged into each other at a start region of the winding mat and/or at an end region of the winding mat and are stacked on top of each other in at least one region in between without plugging sub-sections into each other.

It is preferred that in step b) a pair or a group of first wave winding wires are respectively plugged into a pair or a group of second wave winding wires.

It is preferred that in step a) at least one first, at least one second and at least one third wave winding wire are prepared and that in step b) only the at least one first and the at least one second wave winding wire are plugged, and that said at least one third wave winding wire is joined with the at least one first and the at least one second wave winding wire by stacking and not by plugging.

It is preferred that step a) comprises one or both of steps a4) or a5), and step b) further comprises:
- b7) plugging the first wave winding wire and the second wave winding wire into each other in an alignment position where the longitudinal center axes of the first and second wave winding wires lie on top of each other, wherein the straight wire sections of the first and second wave winding wires become arranged on a common plane, at least in a standard region of the wave mat.

It is preferred that step b) is repeated with the unit already formed of several wave winding wires plugged into each other and with a further wave winding wire or pair or group of further wave winding wires in a manner analogous to that of the first wave winding wire and the second wave winding wire until all wave winding wires are joined together in a winding mat.

It is preferred that the winding mat manufacturing method is carried out to produce a single-layer winding mat in which a sequence of individual straight wire sections not superimposed on each other is provided in the longitudinal direction of the winding mat.

It is preferred that in step b) the first and/or the second sub-section of both the first and the second wave winding wires each comprise at least three winding heads so that at least one central winding head is situated between at least two outer winding heads, and that step b) further comprises the steps to be carried out after step b3):
- b4) pushing the first and the second wave winding wires into each other beyond the alignment position where the first and the second wave winding wires are aligned with their longitudinal central axes relative to one another until the winding heads which in step b1) were located on the side facing away from the other wave winding wire abut against one another;
- b5) swapping the height position of the at least one central winding head of the first wave winding wire and the second wave winding wire and
- b6) pushing the first and the second wave winding wires into each other into the alignment position.

According to another aspect, the invention provides a coil mat manufacturing method for manufacturing a coil mat to form the coil winding of a component of an electrical machine, the method comprising:
- i) producing a first individual mat by joining 3n1 individual wave winding wires,
- j) producing a second individual mat by joining 3n2 individual wave winding wires; and
- k) joining the first individual mat and the second individual mat, wherein n1 and n2 are natural numbers greater than 0 and wherein the wave winding wires have straight wire sections spaced apart in the longitudinal direction of the coil mat and extending in a transverse direction running transversely to the longitudinal direction, and intermediate roof-shaped winding heads such that adjacent straight wire sections are connected to each other by a winding head bent in a roof shape, thus forming half-wave sections in such a manner that first half-wave sections with first winding heads bent in a first direction and second half-wave sections with second winding heads bent in an opposite direction are alternately provided, and a first half-wave section and an adjacent second half-wave section respectively form a wave section.

In a first alternative of the coil mat manufacturing method, at least one or both of steps i) and j) comprise carrying out the wave mat manufacturing method according to the configuration described above.

In a second alternative of the coil mat manufacturing method, which may be provided alone or in combination with the first alternative, step k) comprises:
joining the individual mats not by interlacing or twisting, but by plugging the individual mats together, comprising:
- k1) arranging the first and the second individual mats side by side so that their straight wire sections are aligned with each another with a common directional component;
- k2) arranging a first sub-section and an adjacent second sub-section of the first individual mat in such a way that the first sub-section is higher than the second sub-section, and arranging a first sub-section of the second individual mat opposite the first sub-section of the first individual mat in such a way that it can be pushed under the first sub-section of the first individual mat, and a second sub-section of the second individual mat opposite the second sub-section of the first individual mat in such a way that it can be pushed over the second sub-section of the first individual mat, and
- k3) pushing the first individual mat and the second individual mat into each other in the direction of the directional component of the straight wire sections aligned with each other, the first sub-section of the second individual mat being pushed under the first sub-section of the first individual mat and the second sub-section of the second individual mat being pushed over the second sub-section of the first individual mat.

It is preferred that step k) is performed in such a way that a respective straight wire section of the first individual mat and a respective straight wire section of the second individual mat come to lie on each other in the height direction.

It is preferred that steps i) and j) be carried out in such a way that the straight wire sections of the first sub-section of the first individual mat are higher than the straight wire sections of the second sub-section of the first individual mat and/or of the first sub-section of the second individual mat by a height extension corresponding at least to the wire thickness.

It is preferred that steps i) and j) be carried out in such a way that the straight wire sections of the second sub-section of the second individual mat are higher than the straight wire sections of the first sub-section of the second individual mat and/or of the second sub-section of the first individual mat by a height extension dimension corresponding to at least the wire thickness.

It is preferred that step k) comprises:
- k7) plugging the first individual mat and the second individual mat into each other in an aligned position where the longitudinal central axes of the first and the second individual mats lie one on top of the other.

It is preferred that in step k) the first and/or the second sub-sections of both the first and the second wave winding wires each comprise at least three winding head groups such that at least one central winding head group is respectively situated between at least two outer winding head groups, and that step k) further comprises the steps to be carried out after step k3):

k4) pushing the first and second individual mats into each other beyond the alignment position where the first and second individual mats are aligned with their longitudinal central axes relative to one another until the winding heads which in step k1) were located on the side facing away from the respective other individual mat abut against each other;

k5) swapping the height position of the central winding head groups of the first individual mat and the second individual mat; and k6) pushing the first and the second individual mats into each other in the alignment position.

It is preferred that steps i) and j) be carried out in such a way that each winding head is provided with a first height offset by half a height extension dimension at a first winding head section which connects to a first straight wire section, a second height offset by a full height extension dimension at a second winding head section which connects to the first winding head section, and a third height offset by half a height extension dimension at a third winding head section which extends between the second winding head section and the second straight wire section.

Further preferably, it is provided that each wave winding wire has a wire thickness in the straight sections which, measured in a height direction running transversely to the longitudinal direction and transversely to the transverse direction, extends over a wire thickness dimension, and that the height extension dimension is selected depending on the wire thickness dimension. Preferably, the height extension dimension is determined to be equal to the wire thickness or equal to the wire thickness plus a predetermined tolerance.

Preferably, the height extension dimension is dependent on the wire thickness. In particular, the height extension dimension is dependent on the wire thickness dimension. Preferably, the height extension dimension results from the wire thickness plus a tolerance that takes into account room/clearance to the wire below/next to it as well as other distances chosen for design reasons. The height extension dimension indicates how high the jump in the winding heads is. The tolerance by which the height extension dimension is greater than the wire thickness dimension is preferably much smaller than the wire thickness dimension and is, for example, in a range of 0.001% to 5% of the wire thickness. Preferably, typical tolerance values are taken into account in the tolerance dimension in such a way that adjacent wires lie on each other without tension and there is preferably a small clearance between adjacent wires lying on each other.

It is preferred that the individual mats are stepped in a stair-like manner, with at least one transition region forming a step in the height direction in such a way that the individual mats and thus also the resulting coil mat have a start region, several standard regions with a respective intermediate transition region, and an end region, wherein, when the coil mat is used as intended, the first height direction in the height offsets of the winding heads corresponds to a direction radially outwards and the second height direction corresponds to a direction radially inwards, that the individual winding heads are designed with a winding head shape which is selected from a group of winding head shapes comprising:

a first winding head shape where the first height offset is directed in the second height direction, the second height offset is directed in the first height direction and the third height offset is directed in the second height direction, a second winding head shape where the first height offset is directed in the first height direction, the second height offset is directed in the second height direction and the third height offset is directed in the first height direction, a third winding head shape where the first height offset is directed in the first height direction, the second height offset is directed in the first height direction and the third height offset is directed in the second height direction, a fourth winding head shape where the first height offset is directed in the first height direction, the second height offset is directed in the second height direction and the third height offset is directed in the second height direction, a fifth winding head shape where the first height offset is directed in the second height direction, the second height offset is directed in the first height direction and the third height offset is directed in the first height direction; and a sixth winding head shape where the first height offset is directed in the second height direction, the second height offset is directed in the second height direction and the third height offset is directed in the first height direction, and that in said standard regions winding heads with the first or the second winding head shape are provided and that at least some of the wave winding wires in the transition region are given winding heads with the third and/or the fourth and/or the fifth and/or the sixth winding head shape.

It is preferred that the first and the second individual mats are stacked on one another and that in the first individual mat,
in the start region and in the standard regions, the winding heads are given the second winding head shape; in the transition region, the winding heads of at least one wave winding wire or group of wave winding wires are given the fourth winding head shape and the winding heads of at least one other wave winding wire or group of wave winding wires are given the sixth wave winding shape; and at the end region, the winding heads of the at least one wave winding wire or group of wave winding wires are given the fourth winding head shape; and in the second individual mat,
in the start region, the winding heads of at least one wave winding wire or group of wave winding wires are given the fourth winding head shape; in the standard regions as well as in the end region, the winding heads are given the first winding head shape: and in the transition region, the winding heads of the at least one wave winding wire or group of wave winding wires are given the fourth winding head shape and the winding heads of at least one other wave winding wire or group of wave winding wires are given the sixth wave winding shape.

It is preferred that the first and the second individual mats are stacked on one another and that
in the first individual mat,
in the start region and in the standard regions, the winding heads are given the first winding head shape; in the transition region, the winding heads of at least one wave winding wire or group of wave winding wires are given the fifth winding head shape and the winding heads of at least one other wave winding wire or group of wave winding wires are given the third wave winding shape; and at the end region, the winding heads of the at least one wave winding wire or group of wave winding wires are given the fifth winding head shape; and
in the second individual mat,
in the start region, the winding heads of at least one wave winding wire or group of wave winding wires are given the fifth winding head shape; in the standard regions as well as in the end region, the winding heads are given the second winding head shape; and in the transition region, the winding heads of the at least one wave winding wire or group of wave winding wires are given the fifth winding head shape and the winding heads of at least one other wave winding wire or group of wave winding wires are given the third wave winding shape.

It is preferred that the first and the second individual mats are stacked on one another and that
in the first individual mat,
in the start region and in the standard regions, the winding heads are given the first winding head shape; in the transition region, the winding heads of at least one wave winding wire or group of wave winding wires are given the sixth winding head shape and the winding heads of at least one other wave winding wire or group of wave winding wires are given the fourth wave winding shape; and at the end region, the winding heads of the at least one wave winding wire or group of wave winding wires are given the sixth winding head shape; and
in the second individual mat,
in the start region, the winding heads of at least one wave winding wire or group of wave winding wires are given the sixth winding head shape; in the standard regions as well as in the end region, the winding heads are given the second winding head shape; and in the transition region, the winding heads of the at least one wave winding wire or group of wave winding wires are given the sixth winding head shape and the winding heads of at least one other wave winding wire or group of wave winding wires are given the fourth wave winding shape.

It is preferred that the first and the second individual mats are stacked on one another and that
in the first individual mat,
in the start region and in the standard regions, the winding heads are given the second winding head shape; in the transition region, the winding heads of at least one wave winding wire or group of wave winding wires are given the third winding head shape and the winding heads of at least one other wave winding wire or group of wave winding wires are given the fifth wave winding shape; and at the end region, the winding heads of the at least one wave winding wire or group of wave winding wires are given the third winding head shape; and
in the second individual mat,
in the start region, the winding heads of at least one wave winding wire or group of wave winding wires are given the third winding head shape; in the second standard regions as well as in the end region, the winding heads are given the first winding head shape; and in the transition region, the winding heads of the at least one wave winding wire or group of wave winding wires are given the third winding head shape and the winding heads of at least one other wave winding wire or group of wave winding wires are given the fifth wave winding shape.

It is preferred that both the first individual mat and the second individual mat are manufactured by a winding mat manufacturing method according to one of the configurations described above and that the first and second individual mats are plugged into each other and that
in the first individual mat,
in the start region, the winding heads of at least one wave winding wire or each wave winding wire of a group of wave winding wires are given the sixth winding head shape; in the standard regions, the winding heads are given the second winding head shape; in the transition region, the winding heads of the at least one wave winding wire or group of wave winding wires are given a sequence of at least one third and at least two sixth winding head shapes and the winding heads of at least one other wave winding wire or group of wave winding wires are given a sequence of at least one first and at least one fourth wave winding shape; and at the end region, the winding heads of the at least one wave winding wire or group of wave winding wires are given a sequence of at least one third and at least one sixth winding head shape; and
in the second individual mat,
in the start region, the winding heads of at least one wave winding wire or group of wave winding wires are given the sixth winding head shape and the winding heads of another wave winding wire or group of wave winding wires are given the third winding head shape; in the standard regions, the winding heads are given the first winding head shape; and in the transition region, the winding heads of the at least one wave winding wire or group of wave winding wires are given a sequence of at least one second and at least one sixth winding head shape and the winding heads of at least one other wave winding wire or group of wave winding wires are given a sequence of at least one sixth, at least one fourth and at least one third winding head shape; and in the end region, the winding heads of said one wave winding wire or group of wave winding wires are given the second winding head shape and the winding heads of the other wave winding wire or group of wave winding wires are given the sixth winding head shape.

It is preferred that both the first individual mat and the second individual mat are manufactured by a winding mat manufacturing method according to one of the configurations described above and that the first and second individual mats are plugged into each other and that
in the first individual mat,
in the start region, the winding heads of at least one wave winding wire or each wave winding wire of a group of wave winding wires are given the third winding head shape; in the standard regions, the winding heads are given the first winding head shape; in the transition region, the winding heads of the at least one wave winding wire or group of wave winding wires are given a sequence of at least one sixth and at least two third winding head shapes and the winding heads of at least one other wave winding wire or group of wave winding wires are given a sequence of at least one second and at least one fifth wave winding shape; and at the end region, the winding heads of the at least one wave winding wire or group of wave winding wires are given a sequence of at least one sixth and at least one third winding head shape; and in the second individual mat, in the start region, the winding heads of at least one wave winding wire or group of wave winding wires are given the third winding head shape and the winding heads of another wave winding wire or group of wave winding wires are given the sixth winding head shape; in the standard regions, the winding heads are given the second winding head shape; and in the transition region, the winding heads of the at least one wave winding wire or group of wave winding wires are given a sequence of at least one first and at least one third winding head shape and the winding heads of at least one other wave winding wire or group of wave winding wires are given a sequence of at least one third, at least one fifth and at least one sixth winding head shape; and in the end region, the winding heads of said one wave winding wire or group of wave winding wires are given the first winding head shape and the winding heads of the other wave winding wire or group of wave winding wires are given the third winding head shape.

A preferred embodiment of the coil mat manufacturing method is characterized by the method being carried out in such a way that a coil mat without conductor swap and without layer swap is produced.

A preferred embodiment of the coil mat manufacturing method is characterized by the method being carried out in such a way that a coil mat with conductor swap and without layer swap is produced.

A preferred embodiment of the coil mat manufacturing method is characterized by the method being carried out in such a way that a coil mat without conductor swap and with layer swap is produced.

A preferred embodiment of the coil mat manufacturing method is characterized by the method being carried out in such a way that a coil mat with conductor swap and with layer swap is produced.

Advantageously, the component of an electric machine is manufactured by the following steps:
  preparing a component body, carrying out a method according to one of the configurations described above and winding up the mat thus produced to obtain said one coil winding of the component of the electric machine, and inserting the wound-up mat into the component body.

An advantageous device for carrying out a method according to one of the above configurations comprises:
  a supply device for supplying wave winding wires or individual mats, and
  a plugging device for plugging the wave winding wires or the individual mats together by moving the same towards each other in a direction running transversely to their longitudinal direction.

It is preferred that the supply device comprises a wave winding wire manufacturing device for bending the wave sections from a wire, and/or a winding head shaping device for shaping the winding heads.

It is preferred that the wave head shaping device has several bending jaws having bending radii for creating the height offsets.

It is preferred that the device has a control system arranged to control the device to perform the steps of the method according to one of the above configurations.

Advantageously, there is also provided a computer program product or a computer program including machine readable control instructions which when loaded into a computer of the control system cause the device to perform the steps of the method according to any of the foregoing configurations.

Preferably, the wave winding wires are produced by a method and/or device and hence supplied by the supply device as described and shown in the German patent application 10 2017 127 634.3.

Particular embodiments of the invention concern a pluggable wave winding mat. Methods and devices for manufacturing such a mat are also described.

Preferably, the wave winding wires are formed from a profile wire having a profile shape deviating from a round cross-section, in particular a rectangular profile. A rectangular profile shape has advantages because the volume of the slot is optimally filled with a conductor cross-section. The mats and the processes described here are particularly suitable for such profile wires, since the profile wires are not twisted and therefore the stress on the wires and their insulation is low. This leads to an increased reliability and reduces the risk of wire damage.

In the component, conductors of various individual mats of a coil winding or a coil mat are preferably located in one slot.

In order to achieve the highest possible (optimum) efficiency in an electric machine, the coil winding has to meet various properties. A problem that exists in prior art is that if such criteria are met (e.g., optimum filling with conductor material, optimized conductor paths), the coil mat must either be interlaced or the production of the individual wires is very costly. With the designs according to the invention, however, it is possible to produce a winding mat and/or coil mat which consists of individual wires which are as similar as possible and do not have to be interlaced.

For preparing the wave winding wires, a wire manufacturing device is advantageously provided, which makes it possible to offset a winding head with three bend points. It is also advantageous to be able to vary both the Z-direction (up or down) and the bending height in the Z-direction of all bend points in each winding head. It is also advantageous to be able to produce wires for different core stack lengths and shift dimensions. The shift dimension describes the average distance that a wire in the coil head bridges in the X-direction. The shift dimension can also vary within a wire.

Preferably, a device for offsetting wave winding heads at a wave winding wire is provided for this purpose.

Further preferably, in order to produce a winding mat from the individual wave winding wires, a wire handling is proposed which makes it possible to transport, stack and plug-fit the wires. In prior art, the wires have to be interwoven or interlaced in a winding mat in order to produce certain winding schemes; in this case, wire handling is very complex or partly not feasible because the wires have to be twisted. This process step can be replaced by cross-plugging, which can be achieved by pure linear movements. Cross-plugging can always be used if a layer swap on both sides of the core stack is to be achieved.

Preferred embodiments of the invention make it possible to manufacture a winding mat that can be produced by well automatable processes and fulfils the necessary requirements. In addition, the winding head can be designed in such a way that the entire winding head has a lowest possible radial height. Different embodiments provide various winding mats or coil mats, which differ in their electrical properties and manufacturing processes. The better the electrical properties, the higher the manufacturing costs. But even the costs for automating the manufacturing process are still considerably lower than with known methods, even with best electrical properties.

Since interlacing or interweaving proposed in prior art is a very costly process and is also very difficult to automate, the winding mat according to advantageous configurations of the invention is achieved in such a way that it can be produced by stacking, plugging and/or cross-plugging, with partially the same electrical advantages. Special characteristics are found in the method and in the resulting head geometry of the individual wires.

The individual mats are preferably connected in series for potential equalization. In configurations of the invention, a continuous swap of layers does not take place, thus no interlacing of the winding mat is required.

Preferred designs of the invention have three jumps in the individual winding heads. Preferably, there are also winding heads on two planes, but both planes are offset to the plane of the straight sections. Thus, the winding mat and also the coil mat formed from it have a very small extension in the height direction (which corresponds to the radial direction when the winding mat/coil mat is wound up in the component) in the region of the winding heads.

Preferably, the radial extension of a coil mat or winding mat wound in n layers in the component has a maximum value of (n+1) times the height extension dimension in the region of the winding heads.

Advantageously, the wire always remains flat and is not twisted. This is particularly advantageous for profile wire.

Preferably, a plugged mat and defined head shapes are proposed. Preferably, a plugged mat and an interconnection for potential equalization are proposed.

Preferably, three jumps are provided in the head and the respective winding head can also be on two planes, but both planes are offset to the plane of the straight sections. Preferably a coil step of 5-7 in two planes (if with layer swap) is proposed. Preferably, a winding having 12 conductors and a coil step of 6 in the wiring area is proposed. Preferably, a series connection of the individual mats for equipotential bonding is provided. Advantageously, a layer swap and a coil step of 5-7 can be provided and, in addition, the winding mat is not interlaced.

Plugging instead of interlacing has the advantage of easier automatic production. With a suitable head shape, the individual wires jump to the correct position when plugged and align themselves with their straight sections on one plane (except at the stair jump, if provided). The individual wires can also be easily taken apart again, should this ever be necessary. Plugging can be done without any load on the wires, especially without twisting.

A further aspect of the invention relates to offsetting in a flat winding. In particular, offsetting in winding heads of wave winding wires designed as flat winding is described.

Preferably, the winding heads are bent at a first to third point, and in the region of each of these bends an offset is also introduced to obtain a jump in height. A more wire-friendly process is created due to three jump points.

The wire manufacturing device preferably includes a device for bending height offsets.

The device for bending height offsets is preferably designed in such a way that all flat wire sections of the individual wires can be clamped individually and moved individually in the Z-direction. In this manner, all height offsets are bent simultaneously. The jump height is variably adjustable.

In order to produce the different winding head shapes proposed here, three clamping operations are preferably provided simultaneously on three clamping surfaces per winding head. In addition, the clamping force or also a specific clearance can be set.

The device for bending height offsets is preferably designed in such a way that a single wire can be bent or several parallel single wires can be bent at a time.

In order to exclude a change in cross-section, the wire is preferably free in space at the bending points between the clamping surfaces. In this way, the theoretical elongation of the neutral fiber due to a change in radius at the position of the height offset can be prevented.

BRIEF DESCRIPTION OF THE DRAWINGS

Embodiments of the invention will be described in more detail in the following with reference to the attached drawings in which it is shown by:

FIG. 2 is a cross-section through a component of an electrical machine, in particular a stator, preferably of an electric motor, with a coil winding inserted into slots of a housing, which coil winding is formed from a coil mat formed from several winding mats;

FIG. 3 is a schematic representation of a first variant of a coil mat or winding mat designed as a flat mat;

FIG. 4 is a schematic representation, similar to FIG. 3, of a second variant of a coil mat or winding mat designed as a stair-like mat;

FIG. 5 is a plan view of a coil mat, seen in Z-direction (height direction) corresponding to the radial direction in the component according to FIG. 2;

FIG. 6 is a plan view of a winding head of the two wave winding wires of FIG. 1;

FIG. 7 is a perspective view of one winding head of the two wave winding wires of FIG. 1;

FIG. 8 is a plan view of clamping surfaces of a bending device for bending the winding head shape as shown in FIGS. 6 and 7;

FIG. 9 is a view of the bending device seen in an X-direction of the wave winding wires (longitudinal direction) corresponding to the circumferential direction in the component;

FIG. 10 is a perspective view of the bending device;

FIG. 12 is a plan view in a Z-direction of the wave winding wires corresponding to the later radial direction in the component, looking at clamping and bending units of the bending device;

FIG. 13 is a perspective view of a bending jaw of one of the clamping units;

FIG. 14 is a flow chart of a bending process for bending the winding heads; i.e., for introducing height offsets into the winding heads;

FIGS. 15a to 15f are sectional views through a half-wave shape of one of the wave winding wires as viewed in a y-direction (transverse direction) corresponding to the later axial direction in the component, showing corresponding height offsets in the Z-direction of a first to sixth winding head shape;

FIGS. 16 to 18 are plan views of a first and a second wave winding wire at different stages of plugging the wave winding wires in the course of manufacturing a winding mat;

FIGS. 19 and 20 are plan views of an arrangement of wave winding wires at different stages of plugging for forming the winding mat;

FIG. 21 is a perspective view of an arrangement of wave winding wires to illustrate pairwise plugging;

FIG. 22 is a first and a second winding mat as individual mats plugged together to form a coil mat, in a first stage of a coil mat manufacturing process;

FIGS. 23 to 24 are perspective views of the first and second winding mats during different stages of the coil mat manufacturing process;

FIGS. 25a to 25d are plan views of two pairs of wave winding wires during different stages of a variant of the plugging process for producing a coil mat—cross-plugging;

FIG. 27 is a schematic representation of a second type of a coil mat with wire routes, as well as a first individual mat and a second individual mat of this coil mat with the winding head shapes provided in the individual mats;

FIG. 29 is a representation of an end region of a wave winding wire of the coil mat with indicated variants of wire outlets;

FIG. 30 is a first perspective view of a connected coil winding formed from a coil mat with a uniform coil step;

DETAILED DESCRIPTION OF THE PREFERRED EMBODIMENTS

Figure 1:
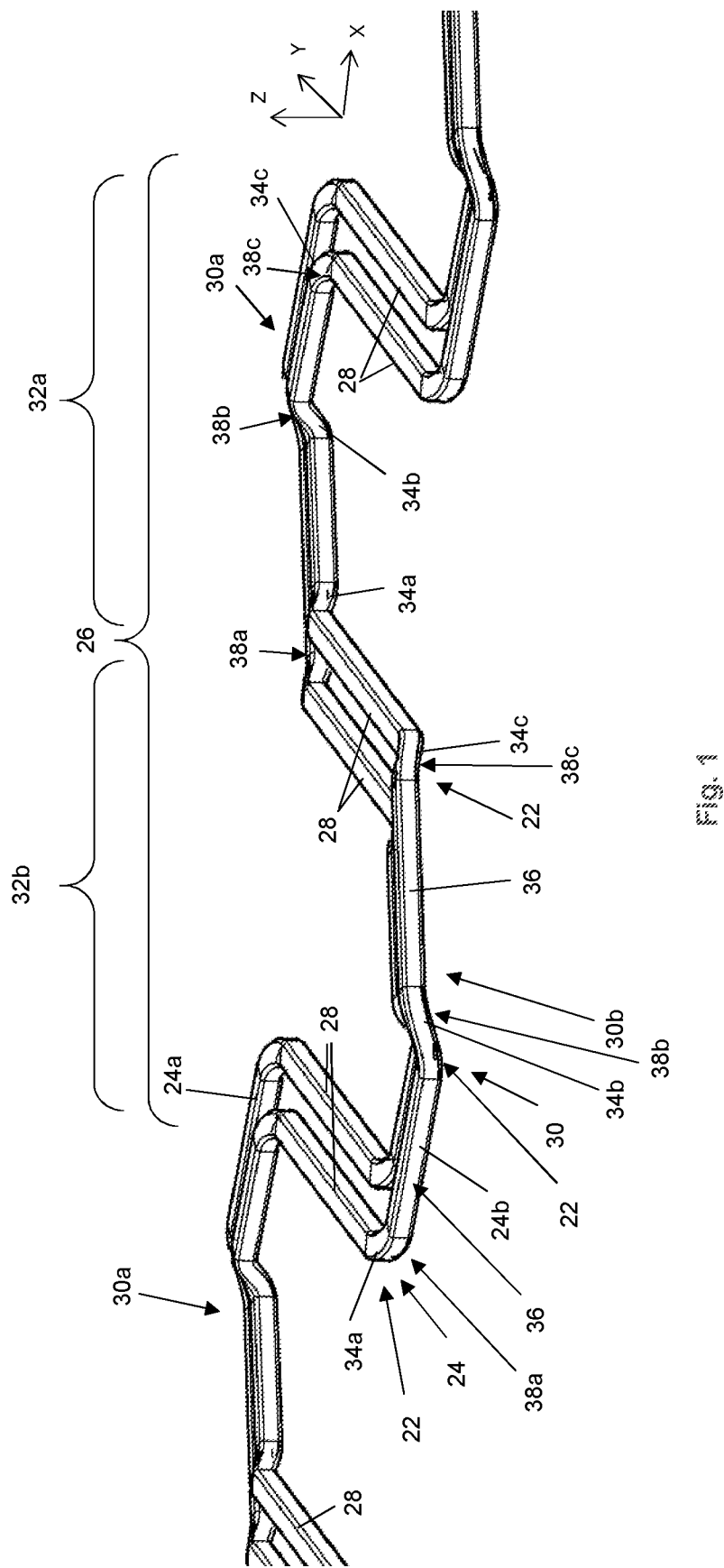
FIG. 1 is a perspective view of two parallel wave winding wires for the production of a winding mat.

FIG. 1 shows a sub-section of a pair of wave winding wires 24, 24a, 24b in a perspective view, which wave winding wires can be combined into a winding mat for creating a coil winding 20. FIG. 1 shows, in particular, a wave section 26 of the pair of wave winding wires 24, 24a, 24b. Each wave winding wire 24 extends in its longitudinal direction pointing in the X-direction in FIG. 1 and comprises a series of straight wire sections 28 spaced apart in this longitudinal direction and extending in a transverse direction—Y-direction, with adjacent straight wire sections 28 being connected to each other by a winding head 30.

The straight wire sections 28 are used to be inserted into the slots 16 of a component 12, e.g., a stator 14. The length of the straight wire section 28 thus essentially corresponds to the axial construction length of the housing 10 which, for example, is formed from a core stack.

Accordingly, in the later intended use of a coil winding 20 formed from the wave winding wires 24, the Y-direction—transverse direction—corresponds to the axial direction in the component 12; the longitudinal direction—X-direction—corresponds to the circumferential direction in the component 12, and the Z-direction, referred to here as the height direction, corresponds to the radial direction when the coil winding 20 formed from the wave winding wires 24 is used as intended.

The wave winding wires 24 are designed as a flat winding and are wave-shaped, with a first winding head 30a bent in a first bending direction and a second winding head 30d having an opposite second bending direction being alternately provided in the longitudinal direction of the wave winding wire 24. Thus, the first winding head 30a is provided at one end of a straight wire section 28 and the second winding head 30b at the second end of the straight wire section. A straight wire section 28 and a first winding head 30a form a first half-wave section 32a and another straight wire section 28 and a second winding head 30a form a second half-wave section 32b, and a wave section 26 is formed of a first half-wave section 32a and a second half-wave section 32b. The distance between adjacent straight wire sections 28 of a wave winding wire 24, which are respectively connected to each another by a winding head 30, corresponds to the shift dimension.

Each winding head 30 is respectively bent at a first bend point 34a, a second bend point 34b and a third bend point 34c, the bend points 34a, 34b and 34c being spaced apart from one another and connected to one another by connecting sections 36. These connecting sections 36 are essentially straight, except for a counter-bend which is explained in more detail below.

At the bend points 34a, 34b, 34c, the wave winding wire 24 is bent in the Y-X plane. Furthermore, this winding head 30 has a jump 22 in the height direction at each of the first to third bend points 34a, 34b, 34c. Depending on the orientation of the jumps 22 at the bend points 34a to 34c, different winding head shapes 1 to 6 are produced as a result, which will be discussed in more detail below.

Each winding head 30 is bent at a total of the three bend points 34a, 34b, 34c, whereby both the Z-direction—up or down—and the bending height of all bend points 34a-34b in the Z-direction can vary in each winding head 30.

The jump 22 in the first bend point 34a forms a first height offset 38a; the jump 22 in the second bend point 34b forms a second height offset 38b; and the jump 22 in the third bend point 34c forms a third height offset 38c.

The length of the straight wire sections 28 substantially corresponds to the length of the laminated core in the axial direction of the housing 10 formed as a core stack. Accordingly, the length of the straight wire sections 28 is chosen in accordance with the axial construction length of the housing 10; altogether, the wave winding wires 24 are produced in each case corresponding to the housing 10, with straight wire sections 28 adapted thereto and with a shift dimension adapted thereto. A supply device for supplying the wave winding wires 24, which will be explained later, is designed in such a way that the wave winding wires 24 can be manufactured with shift dimensions adapted to different core stack lengths and shift dimensions. The shift dimension describes the average distance a winding wire 24 bridges in the X-direction—longitudinal direction—in the winding head 30. The shift dimension can also vary within a wave winding wire 24.

From such winding wires 24, as shown in FIG. 1, winding mats 40 are produced from which the coil winding 20 of a component 12, in particular a stator 14, can be formed, as shown in FIG. 2.

FIG. 2 shows, for example, a housing 10, which is formed from a core stack, of a component 12 designed in particular as the stator 14 of an electric motor, the coil winding 20 formed from one or more winding mats 40 being inserted into radially inwardly open slots 16 in the housing 10 by winding up the winding mat 40. The straight wire sections 28 are inserted into the slots 16, with the first winding heads 30a protruding on one axial side of the housing 10 and the second winding heads 30b protruding on the other axial side of the housing 10.

If a single-layer coil winding 20 is to be formed, this can be achieved with a single winding mat 40. For forming a two-layer coil winding, a coil mat 42 composed of a first winding mat 40 and a second winding mat 40 as individual mats 44a, 44b can be used. A coil mat 40 consists of several individual wave winding wires 24. These are combined into a first individual mat 44a and a second individual mat 44b, each of which is designed as one layer. The individual mats 44a, 44b can then be joined together to form the coil mat 42 in such a way that a straight wire section 28 of the first individual mat 44a and a straight wire section of the second individual mat 44b always lie on one another. Exceptions are a start region 46 and an end region 48 of the coil mat 42.

As shown in FIG. 3, the respective winding mat 40 and the coil mat 42 formed from it can be designed as a flat mat 50. In the case of a flat mat 50, all straight wire sections 28 in each winding mat 40 are on a common plane when not yet wound together, i.e., there is no height offset in the Z-direction between straight wire sections 28 within a winding mat 40. If such a flat mat 50 is wound up several times to insert it into the component 12, a tension is produced in a transition region 52 within the wave winding wires 24, since the straight wire sections 28 change their radial position in this transition region 52.

In order to avoid these tensions, it is also possible to provide a stair-shaped mat 54, as shown in FIG. 3, where a height offset between straight wire sections 28 is provided in those areas of the stair-shaped mat 54 which come to lie in the transition region 52. Thus, in a stair-shaped mat 54, there is a step in the transition regions 52, whereas in the standard regions 56, which lie between the start region 46 and the transition region 52 or between two transition regions 52 or between the transition region 52 and the end region 48, the straight wire sections 28 in each winding mat 40 are all in the same plane when not yet wound up, which means that there is no height offset between the straight wire sections 28 in the standard regions 56.

FIG. 5 shows a plan view (in Z-direction) of one embodiment of a coil mat 42 which is composed of a first individual mat 44a designed as a winding mat 40 and a second individual mat 44b designed as a winding mat 40. The first individual mat 44a is made of three n1 individual wave winding wires 24, and the second individual mat 44b is made of three n2 wave winding wires 24, n1 and n2 being natural numbers ≥0. In the following examples, n1=n2=2. Accordingly, the first individual mat 44y comprises six wave winding wires 24 for example, which are designated aa, ab, ac, ad, ae and of in the following tables. Accordingly, the second individual mat 44b also comprises six wave winding wires 24, which are designated by, bb, bc, bd, be and bf in the following tables.

Each winding mat 40 can be produced by stacking STP the wave winding wires 24 (simply putting them on top of each other) or, in particular, by plugging STK the individual wave winding wires 24, which is explained in more detail below. The coil mat 42 can be produced by stacking STP the individual mats 44a, 44b or by plugging STK the individual mats 44a, 44b, which is explained in more detail below.

By using these methods, which are explained in more detail below, different winding schemes can be created for the coil mat 42, which are shown in the following tables 1 to 4. The respective winding scheme can be understood if the coil mat 42 is cut in the middle, as shown in FIG. 5, and then viewed in the X-direction from one side.

In the examples of winding schemes shown in tables 1 to 4, the first individual mat 44a has six wave winding wires 24a-24f designated aa, ab, ac, ad, ae, of in the tables. The six wave winding wires 24a-24f of the second single mat 44b are designated bg, bh, bi, bj, bk, bl. The a or b in the top row of each table thus designate the position a or b (single mat 44a or single mat 44b), and the letters a to l at the bottom of each row in the table designate the respective wave winding wire.

Table 1 shows the wire arrangement in the respective slot 16 for a coil mat 42 without conductor swap and without layer swap. For a coil mat 42 of this type without conductor swap and without layer swap and with the same number of individual wires n1=n2, the zone width corresponds to 0.5*n1=0.5*n2 and thus to half the number of individual wires. In the case of such a coil mat 42 without conductor swap and without layer swap, a flat mat 50 is produced by simple stacking. If a stair-shaped mat 54 is to be produced, the individual wave winding wires 24 in the individual mats 44a, 44b are plugged. Accordingly, the individual mats 44a, 44b are produced by plugging.

TABLE 1

Wire arrangement in the slot - without conductor swap and without layer swap

| ab | ac | ad | ae | af | aa | ab | ac | ad | ae | af |
|----|----|----|----|----|----|----|----|----|----|----|
| bg | bh | bi | b  | bk | bl | bg | bh | bi | b  | bk | bl |

In the following table 2, a winding scheme for a coil mat 42 with conductor swap and without layer swap is explained.

For the coil mat 42 with conductor swap and without layer swap, the zone width corresponds to the number $n_1 = n_2$ of the individual wires. A flat mat 50 having this winding scheme can be produced by stacking. A stair-shaped mat 54 having this winding scheme can be produced by plugging the individual wires.

TABLE 2

Wire arrangement in the slot - with conductor swap and without layer swap

| a a | a a | a a | a a | a a | a a | a a a a a a a a a a a a |
|-----|-----|-----|-----|-----|-----|-------------------------|
| b c | d e | f b | a d | c f | e a | b c d e f b a d c f e   |
| b b | b b | b b | b b | b b | b b | b b b b b b b b b b b b |
| g h i | j k | l h | g j | i l | k g | h i j k l h g j i i k |

The following table 3 shows the winding scheme of a coil mat 42 without conductor swap and with layer swap. The zone width of a coil mat 42 having this winding scheme corresponds to twice the number 2n1=2n2 of the individual wires. A flat mat 50 is possible by plugging the individual mats 44a, 44b. A stair-shaped mat 54 can be produced by plugging the individual mats 44a, 44b and cross-plugging of the individual wave winding wires 24.

TABLE 3

Wire arrangement in the slot - without conductor swap and with layer swap

```
a a   a a   a a   a a   a a   a b   b b b b b b b b b b
b c   d e   f a   b c   d e   f g   h i j k l g h i j k l b b b   b b   b b   b b   b b   b a   a a a a a a a a a a
g h i   j k   l g   h i   j k   l a   b c d e f a b c d e f
```

The following table 4 shows the winding scheme of a coil mat 42 with conductor swap and with layer swap. The zone width corresponds to twice the number $2n_1=2n_2$ of the individual wave winding wires. A flat mat 50 can be produced with this winding scheme by plugging the individual mats 44a, 44b. A stair-shaped mat 54 can be produced with this winding scheme by plugging the individual mats 44a, 44b and cross-plugging of individual wave winding wires 24.

TABLE 4

Wire arrangement in the slot - with conductor swap and with layer swap

```
a a   a a   a a   a a   a a   a b   b b b b b b b b b b
b c   d e   f b   a d   e f   e g   h i j k l h g j i l k b b b   b b   b b   b b   b b   b a   a a a a a a a a a a
g h i   j k   l h   g j   i l   k a   b c d e f b a d e f e
```

Figure 26:
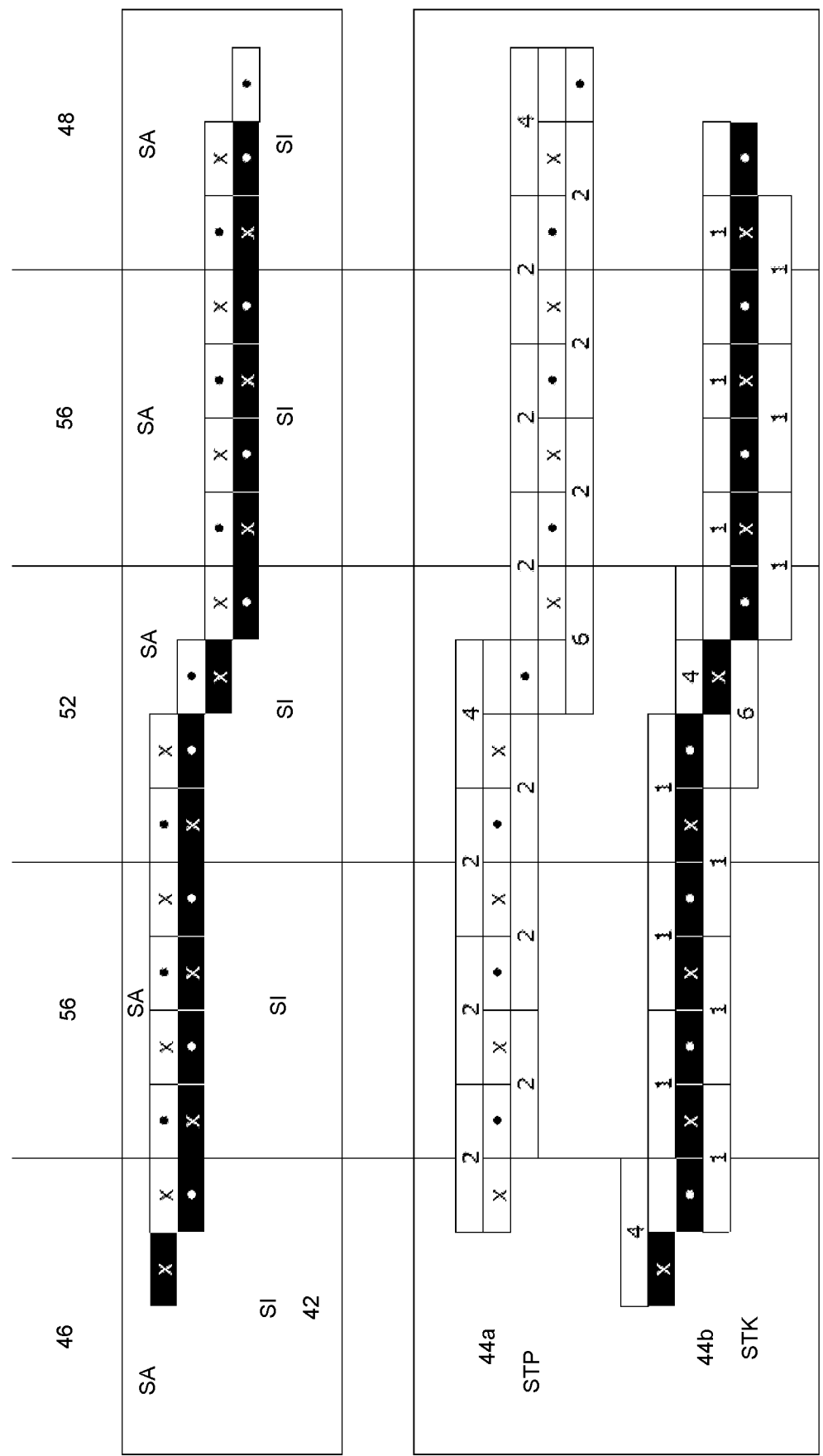
FIG. 26 is a schematic representation of a first embodiment of a coil mat with wire routes, as well as a first individual mat and a second individual mat of this coil mat with the winding head shapes provided in the individual mats.
Figure 37:
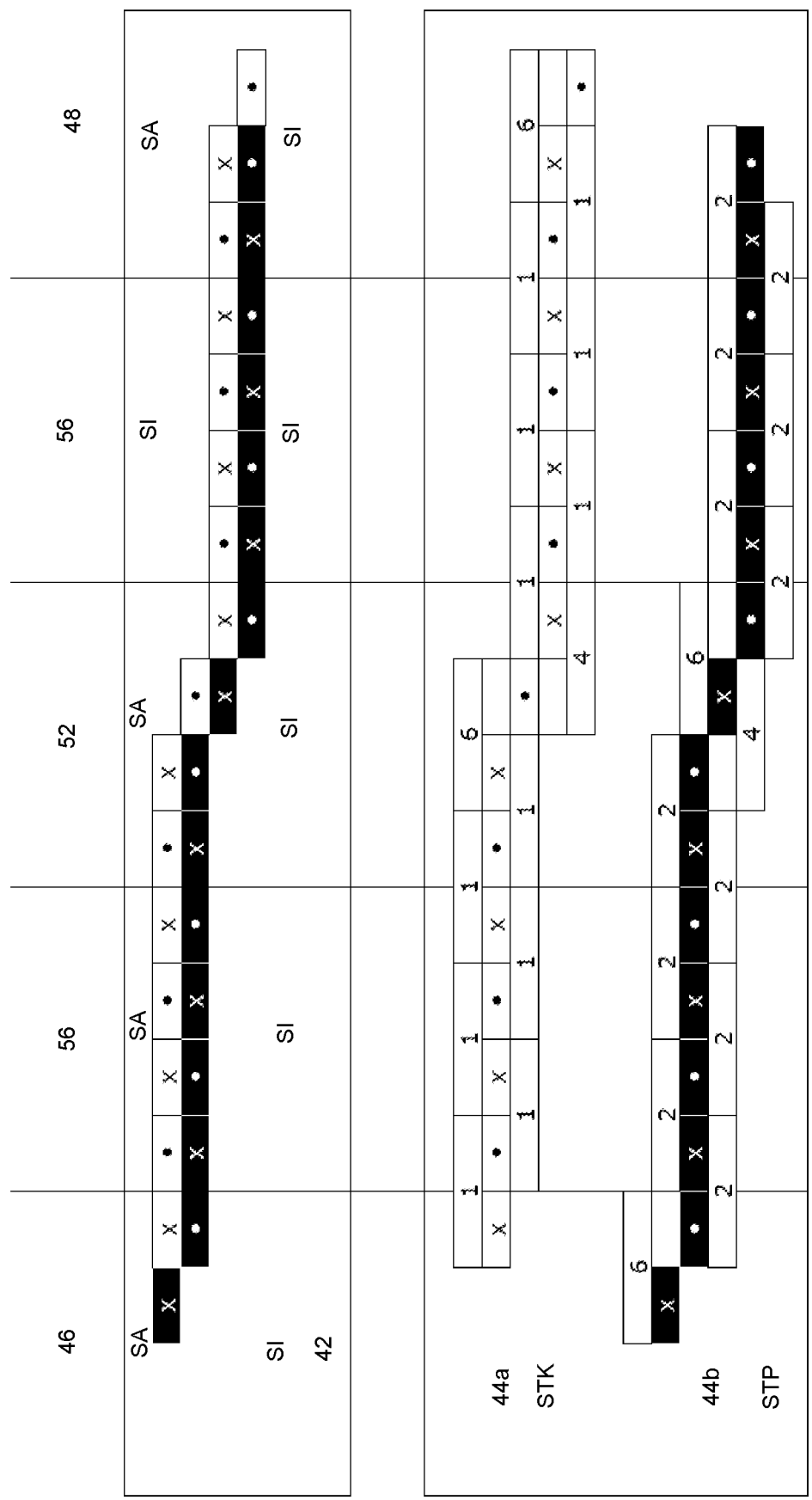
Figure 28:
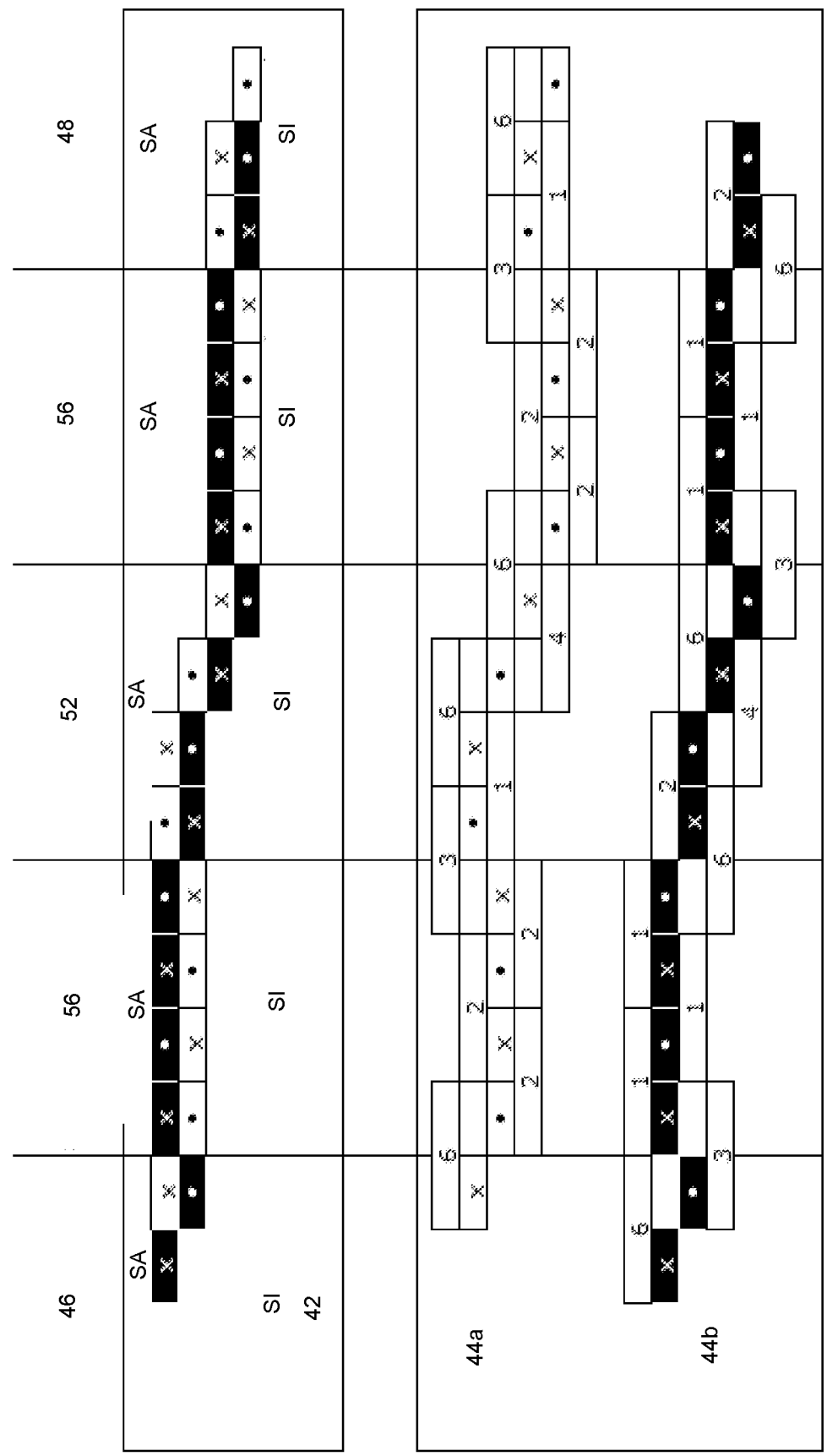
FIG. 28 is a schematic representation of a third type of coil mat with wire routes, as well as a first individual mat and a second individual mat of this coil mat with the winding head shapes provided in the individual mats.

Methods for manufacturing the coil mats 42 in accordance with the above-explained winding schemes are described in more detail in the following. With reference to FIGS. 6 and 7, the design of the individual wave winding wires 24 is first described in more detail, then a device and a method for providing such wave winding wires are explained with reference to FIGS. 8 to 14, and then different winding head shapes 1 to 6 to be created using these devices and methods are explained with reference to FIGS. 15a to 15f. FIGS. 16 to 21 are then used to explain the manufacture of a winding mat 40 representing one of the individual mats 44a, 44b by plugging the wave winding wires 24. FIGS. 22 to 24 are then used to explain how to make a coil mat 42 by plugging the individual mats 44a, 44b. Then the process of cross-plugging is explained with reference to FIGS. 25a to 25d. FIGS. 26 to 28 then show three specific embodiments of the coil mat 42; a manufacture of the coil winding 20 and its connection are then explained with reference to FIGS. 29 to 33.

FIG. 6 shows a plan view of first winding heads 30a of a pair of wave winding wires 24, 24a, 24b, and FIG. 7 shows a perspective view of second winding heads 30b of the pair of wave winding wires 24, 24a, 24b. The first winding head 30a of the first wave winding wire 24a is designed in such a way that a coil step of 7 is obtained, whereas the first winding head 30a provides for a coil step of 5 for the second wave winding wire 24b. Accordingly, a coil step of 5 is provided for the second winding head 30b of the first wave winding wire 24a, whereas a coil step of 7 is provided for the second winding head 30b of the second wave winding wire 24b. Thus, a coil step of 5-7 and a total coil width of 6 are achieved.

The winding heads 30 have a central roof bend 58 at the second bend point 34b and a transition bend 60a, 60b at the first bend point 34a and at the third bend point 34c. Between the transition bend 60a, 60b and the roof bend 58, the respective connecting section 36 is provided. The region of the first transition bend 60a forms a first winding head section 62a, the region of the roof bend 58 forms a second winding head section 62b, and the region of the second transition bend 60b forms a third winding head section 62c. Each connecting section 36 also has a counter-bend 64.

The individual wave winding wires 24 are basically the same for all variants of winding mats 40 and also for coil mats 42. They are each formed from a profile wire and in particular from a rectangular profile wire. The Z-height offsets 38a, 38b, 38c, which will be explained in more detail below, can differ in the individual wave winding wires 24, 24a, 24b. Both the direction and height of the height offset 38a, 38b, 38c can vary. Each height offset 38a, 38b, 38c can be directed in a first height direction HR1 or in a second height direction HR2. The first height direction HR1 can, for example, extend in the Z-direction so that it corresponds to the direction radially outwards when the coil mat 42 is used as intended in the component 12; the second height direction HR2 is directed opposite to the first height direction HR1 and can, for example, extend in the Z-direction so that it corresponds to the direction radially inwards when the coil mat 42 is used as intended in the component 12. The amount of the height of the height offsets 38a, 38b, 38c corresponds in particular to a half or a whole height extension dimension HM. The height extension dimension HM corresponds to the extension of each straight wire section 28 in the Z-direction (height direction) plus a predetermined tolerance value. The tolerance value takes into account a play/room between adjacent wires and any other distances selected for design reasons.

With regard to the winding head shape, which can be characterized by the respective direction and the respective height of the height offsets 38a, 38b, 38c in the winding head 30, each wave winding wire 24 can differ within a coil mat 42 and a winding mat 40. Each individual wave winding wire 24 can also have different winding head shapes at different winding heads 30.

The winding head 30 of the wave winding wires 24 has a roof shape with a slight counter-bend 64, as explained above. The height offsets 38a, 38b, 38c are bent into the wave winding wire 24 at the three bending points 34a, 34b, 34c. FIGS. 15a to 15f show that these differ in height and direction. The counter-bending 64 allows more space for bending the height offsets 38a, 38b, 38c without increasing the winding head height WKH (extension of the winding head 30 in the Y-direction). Furthermore, no wave winding wire 24 is twisted at any point of time. The orientation of the upper surface OF and the lower surface UF remains the same along the neutral fiber.

In the following, reference is made to FIGS. 8 to 14 for a more detailed description of a wave winding wire supply device 66 for supplying the wave winding wires 24, 24a, 24b. The wave winding wire supply device 66 comprises a wave winding wire manufacturing device 68 and a winding head shaping device 70 for shaping the winding heads 30, 30a, 30b.

Figure 11:
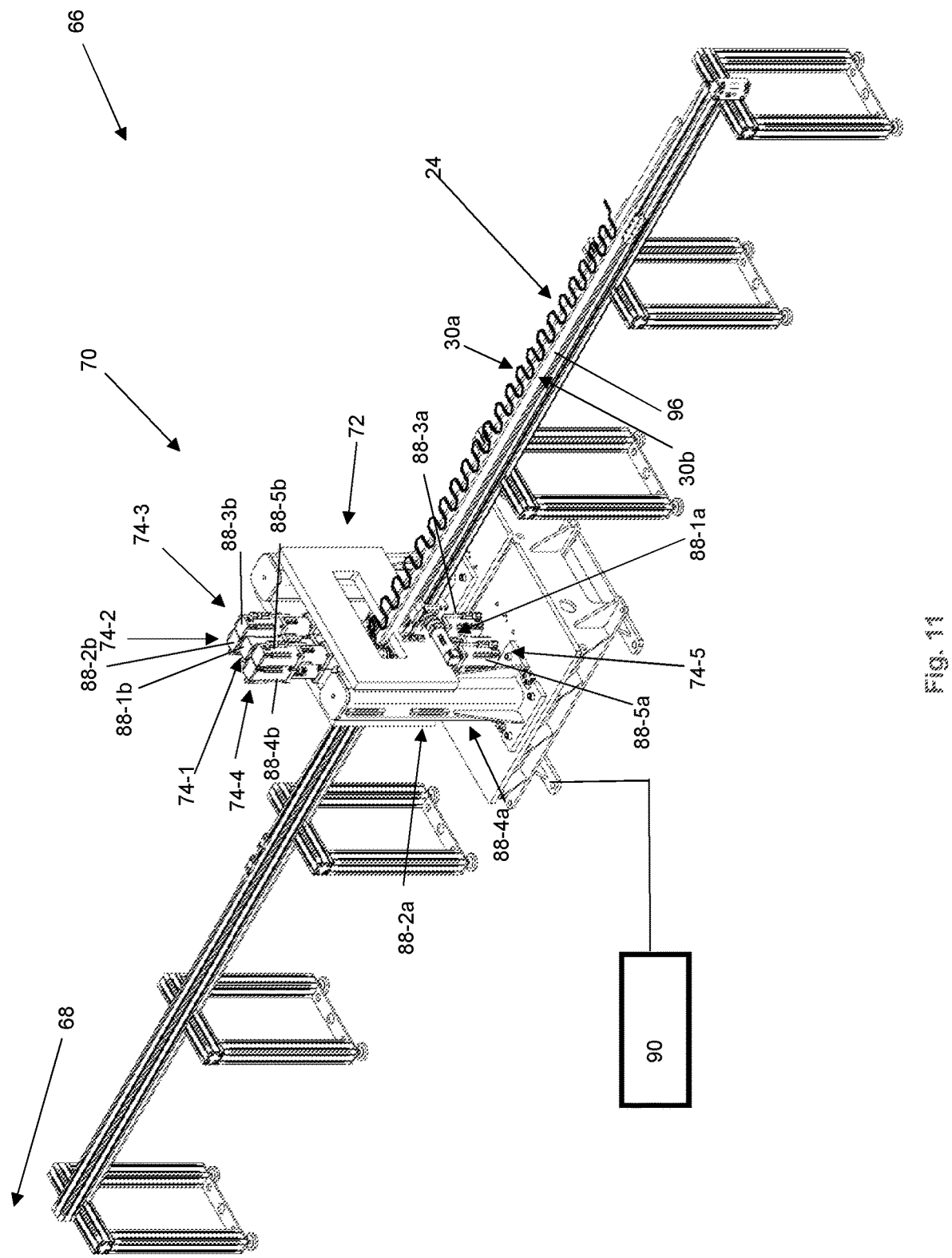
FIG. 11 is an overall perspective view of a wave winding wire supply device comprising the bending device.

The wave winding wire manufacturing device 68 is merely indicated by an arrow in FIG. 11 and is not shown in detail. The wave winding wire manufacturing device 68 is designed as described and shown in German patent application DE 10 2017 127 634.3 to which reference is expressly made for further details. The wave winding wires 24, 24a, 24b are accordingly produced as a flat winding in one plane, with the transition bends 60a, 60b and roof bends 58 as well as the counter-bends 64 being created in the winding heads 30, 30a, 30b at the bend points 34a, 34b, 34c. This bending operation is carried out with appropriately selected bending elements in such a way that the winding heads 30, 30a, 30b provide the respectively desired shift dimensions and thus coil steps between the straight wire sections 28 plus an amount in the X direction which corresponds to the change in the extension of the winding head 30 in the X direction when the height offsets 38a, 38b, 38c are introduced. In this still flat state, the wave winding wires 24, 24a, 24b are fed to the winding head shaping device 70 individually or as a group, in particular as a pair of wave winding wires 24a, 24b, as shown in the exemplary embodiment.

The winding head shaping device 70 comprises a clamping device 72 shown in FIGS. 8 to 10 and 12 and having a first to fifth clamping unit 74-1, 74-2, 74-3, 74-4, 74-5.

The first clamping unit 74-1 is a central clamping unit for holding the straight wire sections 28, between which the winding heads 30, 30a, 30b are located which are to be provided with the height offsets 38a, 38b, 38c in the winding head shaping device 70. In the embodiment shown, the first and second winding heads 30a, 30b of a wave section 26 can be shaped simultaneously. For this purpose, the first clamping unit 74-1 has a first clamping jaw 76a and a second clamping jaw 76b, which are designed for simultaneously clamping and holding three adjacent straight wire sections 28 of the wave winding wires 24a, 24b to be shaped simultaneously. For this purpose, the clamping jaws 76a, 76b have flat clamping surfaces 92-1 which are pressed against the upper surface OF or the lower surface UF of the straight wire sections 28 and thus hold the straight wire sections 28 on one plane.

The second to fifth clamping units 74-2, 74-3, 74-4, 74-5 each have a first bending jaw 78a and a second bending jaw 78b, one of which is individually shown in FIG. 13. Each bending jaw 78a, 78b has a fixing portion 80 and a shaping portion 82. Flat clamping surfaces 92-2 and 92-3 for clamping the connecting sections 36, and bending dies 84 having bending radii 86 are provided on the shaping section 82 formed on a cantilever in order to gently shape the bending points 34a, 34b, 34c, i.e., to provide them with the height offsets 38a, 38b, 38c. This causes the wire to be bent at the bend points 38a, 38b, 38c. The wave head shaping device 70 is thus designed as an offsetting device.

Each clamping jaw 76a, 76b and each bending jaw 78a, 78b of each of the clamping units 74-1, 74-2, 74-3, 74-4, 74-5 can be moved in the Z-direction by its own actuator 88-1a, 88-1b, 88-2a, 88-2b, 88-3a, 88-3b, 88-4a, 88-4b, 88-5a, 88-5b. Each actuator 88-1a, 88-1b, 88-2a, 88-2b, 88-3a, 88-3b, 88-4a, 88-4b, 88-5a, 88-5b can be individually controlled by a control unit 90. Movement patterns for the actuators 88-1a, 88-1b, 88-2a, 88-2b, 88-3a, 88-3b, 88-4a, 88-4b, 88-5a, 88-5b for creating one of six winding head shapes 1, 2, 3, 4, 5, 6 (shown in FIGS. 15a to 15f) are stored in the control unit 90. Which of the winding head shapes 1, 2, 3, 4, 5, 6 is to be created, results from the selected winding scheme and is explained in more detail below using three design examples 42-1, 42-2, 42-3 for the coil mat 42 shown in the FIGS. 26-28.

The winding head shaping device 70 shown in FIGS. 8 to 13 is a device for bending the height offsets 38a, 38b, 38c. One function of the winding head shaping device 70 is to clamp individual sections 28, 62a, 62c of the individual wave winding wires 24a, 24b individually and to move them individually in the Z-direction. In this manner, all height offsets 38a, 38b, 38c are bent simultaneously. The jump height can be adjusted in a variable manner. In order to cover all possible winding head shapes 1 to 6 described in the following, clamping at three points is provided at the three clamping surfaces 92-1, 92-2, 92-3 at the same time—especially at the straight wire sections 28, the first winding head section 62a and the third winding head section 62c—for each winding head 30, 30a, 30b. The clamping force or even a specific clearance can be adjusted.

FIG. 8 shows an arrangement of a first clamping surface 92-1, a second clamping surface 92-2 and a third clamping surface 92-3, using the shaping of the first winding head 30a as an example. The first clamping surface 92-1 is arranged on one of the clamping jaws 76a, 76b of the first clamping unit 74-1, the second clamping surface 92-2 is arranged on a bending jaw 78a, 78b of the second clamping unit 74-2, and the third clamping surface 92-3 is arranged on a bending jaw 78a, 78b of the third clamping unit 74-3. It can be seen that it is possible to bend one wave winding wire or several parallel wave winding wires 24a, 24b at a time.

In order to avoid a change in cross-section, the wire is free in space at the bending points 34a, 34b, 34c between the clamping surfaces 92-1, 92-2, 92-3. This prevents the theoretical elongation of the neutral fiber by a change of the radius at the point of the height offset 38a, 38b, 38c.

A respective winding head 30, 30a, 30b is shaped by a bending unit 86. Each bending unit 86 has two opposite linear actuators, e.g., the actuators 88-2a, 88-2b, 88-3a and 88-3b for shaping the first winding head 30a using mirrored clamping jaws—e.g., the first bending jaw 78a of the second clamping unit 74-2 and the first bending jaw 78a of the third clamping unit 74-3 as well as the second bending jaw 78b of the second clamping unit 74-2 and the second bending jaw 78b of the third clamping unit 74-3—for shaping the first winding head 30a, as shown in FIGS. 9 and 10.

Therefore, for bending a winding head 30a, only three clamping units 74-1, 74-2, 74-3 are used at each time. After each bending operation, the wave winding wire or, as here, the group of winding wires 24a, 24b is clocked to move on around a winding head on a carriage 88. If the winding head shaping device 70 is designed with several bending units 86 arranged side by side, any number of winding heads 30, 30a, 30b can be shaped simultaneously, up to simultaneously bending all winding heads 30.

FIG. 13 shows the design of the bending jaws 78a, 78b of the second to fifth clamping units 74-2 to 74-5 using the first bending jaw 78a of the second clamping unit 74-2 as an example. The bending jaw 78a has a flat clamping surface—here, e.g., the second clamping surface 92-2—used for clamping the wire. In addition, at the edges which cross the wire, the bending jaw 78a has bending radii 86 for creating the height offsets 38a, 38b, 38c. FIG. 13 shows one of the bending jaws 78a having the clamping surface 92-2 and two bending radii 86.

FIGS. 11 and 12 show how the basic structure of the winding head shaping device 70 for bending the height offsets in the winding heads can look like. Here five clamping units 74-1, 74-2, 74-3, 74-4, 74-5 are arranged in such a way that two clamping units 74-2, 74-3 and 74-4, 74-5 on each side bend the first winding head 30a or the second winding head 30b, and a clamping unit 74-1 in the middle serves to hold down the straight wire sections.

FIG. 14 shows the flow chart for introducing the height offsets 38a, 38b, 38c into the first and second winding heads 30a, 30b of a wave section 26 of the wave winding wires 24a, 24b using the winding head shaping device 70 shown in FIGS. 11 and 12. For example, the height offsets 38a, 38b, 38c are introduced in accordance with one of the winding head shapes shown in FIGS. 15a to 15f. In a method for introducing the height offsets in accordance with a first winding head shape 1 shown in FIG. 15a or a second winding head shape 2 shown in FIG. 15b, the steps are as follows:

S1 Clamping
    S1a first clamping unit 74-1 clamps straight wire sections
    S1b second to fifth clamping units 74-2 to 74-5 clamp the flat connecting sections 36 at the winding head sections 62a, 62c S2 Offsetting
    S2a the bending jaws 78a, 78b of the second to fifth clamping units 74-2 to 74-5 move in the Z-direction in the clamped state, whereby height offsets 38a, 38b, 38c are created S3 Releasing
    S3a releasing the first clamping unit 74-1
    S3b releasing the second to fifth clamping unit 74-2 to 74-5

An alternative procedure is carried out on introducing height offsets 38a, 38b, 38c in accordance with a third to sixth winding head shape 3 to 6 (FIGS. 15c to 15f). For this alternative procedure, the steps in FIG. 14 are:

S1 Clamping
    S1a first tensioning unit 74-1 clamps straight wire sections
    S1b second to fifth clamping units 74-2 to 74-5 clamp the flat connecting sections 36 at the winding head sections 62a, 62c S2 Offsetting
    S2a the bending jaws 78a, 78b of the second to fifth clamping units 74-2 to 74-5 move in the Z-direction in the clamped state, whereby height offsets 38a, 38b are created
    S2b releasing the first clamping unit 74-1, and the bending jaws 78a, 78b of the second to fifth clamping units 74-2 to 74-5 move in the Z-direction, thereby creating the height offset 38b S3 Releasing
    S3b releasing the second to fifth clamping unit 74-2 to 74-5.

Accordingly, step S2b described in this alternative is optional, which is indicated by the brackets in FIG. 14. In this alternative, step S3a is carried out as a part of step S2b.

Then the wave winding wires 24a, 24b are moved on in the longitudinal direction of the wave winding wires 24a, 24b, i.e., the X-direction, by the length of a wave section 26 on the carriage 96, and the sequence illustrated in FIG. 14 is repeated for the next wave section 26 until all winding heads 30, 30a, 30b are shaped corresponding to a specification. Examples of such specifications are still explained in more detail below.

During bending of the winding heads 30, 30a, 30b as described above, the height offsets 38a, 38b, 38c are formed in such a way that one of the winding head shapes 1, 2, 3, 4, 5 and 6 shown in FIGS. 15a to 15f is created. FIGS. 15a to 15f schematically show a section through the corresponding wave winding wire 24, similar to FIG. 5, with the straight wire sections 28 and the intermediate wave winding head 30 having the height offsets 38a, 38b, 38c being shown.

In order to produce the above-described coil mats 42 with different winding schemes, six different winding head shapes 1 to 6 are provided in the configuration shown in FIGS. 15a to 15f. FIGS. 15a to 15f show the plan view of different winding head shapes 1 to 6 of the winding head 30 (in the y-direction of FIG. 7). The viewing direction is such that the left straight wire section 28 comes first when tracing the conductor. Using the first winding head shape 1 as an example: if you trace the conductor, you first proceed radially inwards (example for the second height direction HR2) along a height offset by half a jump (half the height extension dimension HM), then radially outwards (example for the first height direction HR1) by a full jump (full height extension dimension HM) and then again radially inwards by half a jump (half the height extension dimension HM).

Each wave winding wire 24, 24a, 24b has a wire thickness in the straight wire sections 28 which, measured in a height direction (Z-direction) running transversely to the longitudinal direction (X direction) and transversely to the transverse direction (Y direction), extends almost over the height extension dimension HM, i.e., the height extension dimension HM corresponds to the wire thickness of the straight wire sections 28, measured in the height direction, plus a predetermined tolerance.

In each winding head 30, the first height offset 38a extends over half a height extension dimension HM and is provided at the first winding head section 62a which connects to the first straight wire section 28a. In particular, the first height offset 38a is provided in the first transition bend 60a. In addition, in each winding head 30, the second height offset 38b extends over an entire height extension dimension HM at each winding head 30 and is provided at the second winding head section 62b which connects to the first winding head section 62a. In particular, the second height offset 38b is provided in the roof bend 58. For each winding head 30, the third height offset 38c extends over half a height extension dimension HM and is provided at the third winding head section 62c which extends between the second winding head section 62b and a second straight wire section 28b. In particular, the third height offset 38c is provided in the second transition bend 60b. Accordingly, the height of the first and the third height offsets 38a, 38c is equal to half a height extension dimension HM for all winding head shapes 1 to 6, and the height of the second height offset 38b is equal to a full height extension dimension HM for all winding head shapes 1 to 6. However, the height direction is different for the individual height offsets 38a, 38b, 38c of the first to sixth winding head shapes 1 to 6.

Each of the height offsets 38a, 38b, 38c is directed either in the first height direction HR1 or in the second height direction HR2. The first height direction HR1 corresponds to either the radially outward or the radially inward direction when the winding mat 40 or the coil mat 42 are used as intended, and the second height direction HR2 is correspondingly directed in the other direction. In the embodiment shown here, the first height direction HR1 corresponds to the direction radially outwards and the second height direction HR2 corresponds to the direction radially inwards.

FIG. 15a shows a first winding head shape 1 in which the first height offset 38a is directed in the second height direction HR2, the second height offset 38b is directed in the first height direction HR1, and the third height offset 38c is directed in the second height direction HR2.

In FIG. 15b, a second winding head shape 2 is shown in which the first height offset 38a is directed in the first height direction HR1, the second height offset 38b is directed in the second height direction HR2, and the third height offset 38c is directed in the first height direction HR1.

As shown in FIGS. 15a and 15b, the first and second straight wire sections 28a, 28b are in the same plane for the first and the second winding head shapes 1, 2. The first and the second winding head shape 1, 2 shall be provided in particular for the standard regions 56.

FIG. 15c shows a third winding head shape 3 in which the first height offset 38a is directed in the first height direction HR1, the second height offset 38b is directed in the first height direction HR1, and the third height offset 38c is directed in the second height direction HR2.

In FIG. 15d a fourth winding head shape 4 is shown in which the first height offset 38a is directed in the first height direction HR1, the second height offset 38b is directed in the second height direction HR2, and the third height offset 38c is directed in the second height direction HR2.

In FIG. 15e a fifth winding head shape 5 is shown in which the first height offset 38a is directed in the second height direction HR2, the second height offset 38b is directed in the first height direction HR1, and the third height offset 38c is directed in the first height direction HR1.

In FIG. 15f a sixth winding head shape 6 is shown in which the first height offset 38a is directed in the second height direction HR2, the second height offset 38b is directed in the second height direction HR2, and the third height offset 38c is directed in the first height direction HR1.

As can be seen in the FIGS. 15c to 15f, the left and right straight wire sections 28 are offset by a height offset dimension HM in either the first height direction HR1 or the second height direction HR2 in the third to sixth winding head shapes 3 to 6. The third to sixth winding head shapes 3 to 6 shall therefore be provided in those areas where such an offset of adjacent straight wire sections 28 is to be provided, which may be the case in particular in the start region 46, the end region 48 or the transition region 52.

After the wave winding wires 24, 24a, 24b have been manufactured and supplied accordingly by the wave winding wire supply device 66, they are joined together to form a winding mat 40 to form the first individual mat 44a and the second individual mat 44b. Depending on the winding scheme, the wave winding wires 24 are joined together by stacking STP or plugging STK or by cross-plugging.

For stacking the coil mat 42, the individual mats 44a, 44b are laid on top of each other one after the other. It is provided in this case that always two Z-height offsets formed downwards (in the second height direction HR2) lie one above the other, because otherwise the winding head 30 builds up radially. The same applies to the stacking of the individual wave winding wires 24. The height offsets 38a, 38b, 38c of the individual wave winding wires 24 are formed in such a way that the same individual wire is always on top at all crossing points.

In the following, plugging of the wave winding wires 24 is explained in more detail with reference to the illustrations in FIGS. 16 to 21. FIGS. 16 to 18 show different stages in plugging a first wave winding wire 24a and a second wave winding wire 24b. FIG. 19 illustrates plugging of further wave winding wires 24c, 24d, 24e and 24f in addition to the already plugged pair of wave winding wires 24a, 24b. FIG. 20 shows the winding mat 40 obtained by plugging in accordance with FIGS. 16 to 19.

The plugging of the individual wave winding wires 24a to 24f takes place in several steps. This serves to produce individual mats 44a, 44b in which the same wire does not necessarily have to be on top at the crossing points. First, a sub-section of the individual wave winding wires 24a, 24b is always pushed up or down as shown in FIG. 16. The sub-section that is pushed down is shown as a dashed line, the sub-section that is pushed up is shown as a solid line.

As shown in FIG. 16, a first sub-section 98-1a of the first wave winding wire 24a is pushed up and an adjacent second sub-section 98-2a of the first wave winding wire 24a is pushed down. At the second wave winding wire 24b, a first sub-section 98-1b of the first wave winding wire 24a is pushed down and an adjacent second sub-section of the second wave winding wire 24b is pushed up, respectively. The extension of the sub-sections 98-1a, 98-2a over the wave winding wire 24a may be different and may be between a half-wave section 32a and the full length of the wave winding wire 24a minus a half-wave section 32a. In the example shown, the first and second sub-sections 98-1a, 98-2a, 98-1b, 98-2b each comprise a wave section 26 and are alternately provided over the length of the respective wave winding wire 24a, 24b.

The two wave winding wires 24a, 24b are then plugged into one another as shown in FIG. 17.

With the sub-sections 98-1a, 98-2a, 98-1b, 98-2b pushed up and down accordingly, the first and the second wave winding wires 24a, 24b are pushed into each other in the transverse direction as indicated by arrows in FIG. 16 so that, as shown in FIG. 17, the respective first sub-section 98-1a of the first wave winding wire 24a is pushed over the respective first sub-section 98-1b of the second wave winding wire 24b while the respective second sub-section 98-2a of the first wave winding wire 24a is pushed under the second sub-section 98-2b of the first wave winding wire 24b.

Once the wires are completely plugged into each other, all sections of the wave winding wires 24a, 24b jump back to their original plane, resulting in all straight wire sections 28 being on one plane. This is illustrated in FIG. 18. It can be seen that the winding heads 30, 30a, 30b form crossing points 100 in different planes and all straight wire sections 28 are in one plane, as can be seen from the line styles. Double dotted lines are used to show wire sections that lie in the plane 0, in which all straight wire sections 28 lie. The solid lines show wire sections that lie in an upper plane offset upwards (i.e., in the first height direction HR1) from the plane 0 by half a height extension dimension HM, and the dashed lines show wire sections that lie in a lower plane downwardly offset from the plane 0 by half a height extension dimension HM in the second height direction HR2.

In the finished plugged position as shown in FIG. 18, the wave winding wires 24a and 24b are aligned with each other so that their longitudinal center lines are on top of each other. This layer is also referred to as the alignment layer.

This plugging process, which is explained using a first and a second wave winding wire 24a, 24b, is repeated until the entire winding mat 40 and thus one of the individual mats 44a, 44b is achieved. In FIG. 19, this is illustrated using the example of six wave winding wires 24a to 24f. FIG. 20 then shows in a diagram corresponding to FIG. 18 the winding mat 40 thus produced, with the crossing points 100 and the straight wire sections 28 in a common plane.

FIGS. 16 to 20 show the plugging of wave winding wires 24 with the same coil step.

As explained in FIGS. 1 and 6 to 14, the wave winding wires 24 can also be produced in pairs with different coil steps (here 5-7).

As shown in FIG. 21, the wave winding wires 24a, 24b can also always be plugged pairwise with different coil steps using the same principle as explained in FIGS. 16 to 20 for individual wave winding wires 24a-24f with the same coil step.

It can be readily seen that such a plugging of wave winding wires 24a to 24f can be easily automated. A plugging device of a winding mat manufacturing device not shown in detail only requires a movement device for moving the wave winding wires 24a and 24b towards each other, whereby the sub-sections 98-1a, 98-1b, 98-2a and 98-2b are to be pushed upwards or downwards, for example, by means of corresponding sliding guides or grippers.

When the individual mats 44a, 44b have been produced in this way, the coil mat 42 can be made from them. For this purpose, the individual mats 44a, 44b can be stacked or also plugged, as shown in FIGS. 22 to 24.

When plugging the individual mats 44a, 44b, again a first sub-section 102-1a of the first individual mat 44a is pushed up and an adjacent second sub-section 102-2a of the first individual mat 44a is pushed down. For the second individual mat 44b, a corresponding first sub-section 102-1b is pushed down and a corresponding second sub-section 102-2b is pushed up. Then the individual mats 44a, 44b are pushed into each other so that the first sub-section 102-1a of the first individual mat 44a is pushed over the first sub-section 102-1b of the second individual mat 44b and the second sub-section 102-2a of the first individual mat 44a is pushed under the second sub-section 102-2b of the second individual mat 44b.

In order that the individual mats 44a, 44b can be plugged into each other in this way, they cannot have any layer swap on the plug-in side (the respective side to be pushed into the other individual mat). As shown in FIG. 21, when plugging the coil mat 42, the layer swap must therefore always take place on the same side of the individual mats 44a or 44b. This means that the wave winding wires 24a to 24f can change their position in every second winding head 30 at maximum. Accordingly, in one individual mat 44a, a layer swap can only take place in the first winding heads 30a, and in the other individual mat 44b, a layer swap can only take place in the second winding heads 30b.

As shown in FIG. 22, the winding heads 30 are offset downwards and upwards in relation to each other to facilitate plugging. FIG. 22 shows the individual mats 44a, 44b before plugging.

FIG. 23 shows the step of pushing the sub-sections 102-1a, 102-1b, 102-2a and 102-2b into each other. In particular, FIG. 23 shows the two individual mats 44a, 44b in a half-inserted state.

The two individual mats 44a, 44b can be plugged into each other on both sides so that the number of individual wires required for an individual mat 44a, 44b is always alternately located in the upper or lower layer of the coil mat 42 at least twice. This results in the layer swap in the coil mat 42.

FIG. 24 shows the finished plugged coil mat 42. In FIG. 24, plugging of the individual mats 44a, 44b is completed. The longitudinal center lines of the individual mats 44a, 44b lie on top of each other; this layer is also called the alignment layer.

It is readily apparent that this type of plugging individual mats 44a, 44b can also be easily automated. A plugging device (not further illustrated) of a coil mat manufacturing device only requires a movement device for moving the individual mats 44a, 44b towards each other, wherein the sub-sections 102-1a, 102-1b, 102-2a and 102-2b are to be pushed upwards or downwards, for example, by means of corresponding sliding guides or grippers.

In the following, cross-plugging is described in more detail with reference to FIGS. 25a to 25d, using two pairs of wave winding wires 24a, 24b and 24c, 24d.

Cross-plugging is intended if a layer swap is to take place on both sides of the individual mat 44a, 44b. Cross-plugging is suitable for both individual mats 44a, 44b and individual wires—wave winding wires 24, 24a-f. Cross-plugging is carried out in four steps that are explained in FIGS. 25a to 25d below.

FIG. 25a shows as a first step straight plugging. In this first step, plugging is carried out as described above. At the point K2 where cross-plugging is to be carried out, a central winding head K2 and the adjacent winding head K1 and K3 respectively preceding and following said central winding head K2, are in one plane. If cross-plugging is desired at the position of winding head K2 in FIGS. 25a to 25d, the respective winding head at the positions K1, K2 and K3 of the respective individual mat 44a is positioned in one plane (solid at the top, dashed at the bottom), as shown in FIG. 25a.

FIG. 25b shows the second step—overplugging. In contrast to plugging, the wave winding wires 24a, 24b on the one hand and 24c, 24d on the other hand are pushed into each other until the winding heads 30a, 30b are at the stop. Accordingly, the wave winding wires 24a, 24b are thus pushed beyond their alignment position until the winding heads 30a, 30b stop.

As shown in FIGS. 25b and 25c, thereafter, the third step—swap—takes place. The two central winding heads at position K2 are pushed upwards until the winding head previously positioned on the lower plane is now positioned on the upper plane. Thus a layer swap takes place at position K2.

Then, as shown in FIGS. 25c and 25d, the fourth step—reverse plugging—takes place. The wave winding wires 24a, 24b, 24c, 24d are pushed together again until the straight wire sections 28 of the winding mat 40 again lie exactly side by side, as shown in FIG. 25d-alignment position.

Embodiments of the Coil Mats 42—Mat Designs:

In the following, different exemplary embodiments 42-1, 42-2 and 42-3 of coil mats 42 are explained in more detail with reference to the illustrations in FIGS. 26, 27 and 28. In this case, different exemplary embodiments 42-1, 42-2, 42-3 of the coil mat 42 manufactured according to the criteria and processes outlined above are described in greater detail. Three exemplary coil mats 42 are shown in FIGS. 26, 27 and 28. The individual mats 44a, 44b are shown in black and white. The x indicates that the conductors enter into the drawing plane, the point indicates that the conductors exit from the plane. SA designates the outside of the stator 14, and SI designates the inside of the stator. In addition, each array corresponds to the width of the average coil step. Therefore, each conductor—wave winding wires 24a-24f—of an individual mat 44a, 44b is exactly once in each array of an individual mat 44a, 44b. Both individual mats 44a, 44b are formed from wave winding wires 24 that are manufactured with different winding head shapes 1 to 6 shown in FIGS. 15a to 15f. The arrays above and below the individual mats 44a, 44b represent the winding heads 30 that connect the straight wire sections 28 in the individual mats 44a, 44b to each other. The arrays present the winding head shapes 1, 2, 3, 4, 5 or 6 of FIGS. 15a to 15f which are respectively provided and which develop when tracing a conductor from the start region 46 to the end region 48. These are lined up in such a way that the winding head 30 builds up radially by a maximum of one wire thickness. Both individual mats 44a, 44b can be designed with a regular coil step as well as with an alternating coil step (for example of 5-7).

Each coil mat 42, 42-1, 42-2, 42-3 has a start region 46, at least one standard region 56 and an end region 48. Furthermore, the coil mat 42, 42-1, 42-2, 42-3 can have any number of standard regions 56, each of which can be connected to a transition region 52. The different embodiments 42-1, 42-2, 42-3 of the coil mat 42 have a first individual mat 44a and a second individual mat 44b and are designed in such a way that the same individual mat 44a, 44b never lies on top of itself when wound up.

The exemplary embodiments 42-1 and 42-2 of the coil mat 42 shown in FIGS. 26 and 27 represent different versions of a coil mat 42 without layer swap.

The first exemplary embodiment 42-1 of the coil mat 42 shown in FIG. 26 is designed in such a way that in each region always the same individual mat is on top—first individual mat 44a—or bottom—second individual mat 44b. This makes it possible to stack the two individual mats 44a, 44b. The coil mat 42 of the first exemplary embodiment 42-1 is thus produced by stacking the individual mats 44a, 44b. The first individual mat 44a is designed in such a way that it can be produced by stacking STP. The second individual mat 1.1.2 only needs to be plugged in the transition region 52 and in the end region 48—as indicated by plugging STK—and can otherwise be assembled by stacking.

In the second exemplary embodiment 42-2 of the coil mat 42 shown in FIG. 27, all winding heads 30 are radially further out in order to gain more space in the rotor compartment for the connection. The second exemplary embodiment 42-2 of the coil mat 42 is also designed in such a way that in each region always the same individual mat is on top—first individual mat 44a—or bottom—second individual mat 44b. This makes it possible to stack the two individual mats 44a, 44b. In this exemplary embodiment 42-2 of the coil mat 42, the first individual mat 44a only needs to be plugged in the transition region 52 and in the end region 48 and can otherwise be assembled by stacking. The second individual mat 44b is designed in such a way that it can be produced by stacking STP.

FIG. 28 shows one exemplary embodiment 42-3 of a coil mat 42 with layer swap. In particular, in the currently preferred third exemplary embodiment 42-3 of the coil mat 42, in each standard region 56 and in each transition region 52, it can be freely selected which individual mat 44a, 44b is on top. In this case, both the first individual mat 44a and the second individual mat 44b are produced by plugging STK. The entire coil mat 42 is also of the plugged design by plugging the first and second individual mats 44a, 44b into each other.

All exemplary embodiments 42-1, 42-2, 42-3 of the coil mat 42 shown are independent of the direction of rotation when winding the coil mat 42 into the stator. They can be wound up clockwise and also counterclockwise.

The illustrated exemplary embodiments 42-1, 42-2, 42-3 of the coil mat 42 can also be produced in a mirrored fashion. For the mirrored versions on the stator outer side SA or the stator inner side SI, there is the "translation key" of the winding head shapes 1 to 6 from FIGS. 15a to 15f shown in the following Table 5, which translation key applies to all versions.

TABLE 5

Translation key for winding head shapes when mirroring the exemplary embodiments 42-1, 42-2, 42-3:

| Winding head shape of the exemplary embodiment shown: | Becomes the winding head shape in the mirrored version of the exemplary embodiment: |
|---|---|
| 1 | 2 |
| 2 | 1 |
| 3 | 6 |
| 4 | 5 |
| 5 | 4 |
| 6 | 3 |

In the following, examples for the interconnection of the coil mats 42 for forming the coil winding 20 are explained in more detail with reference to the illustration in FIGS. 29 to 32.

FIG. 29 shows the end region 48 of a wave winding wire 24. An exit for connection is normally formed by the last winding head 30 being accomplished only half at the end region 48. The first winding head section 62a then forms the regular exit 104. Instead of this regular exit 104, a mirrored exit 106 is provided by providing the last half winding head 30—first winding head section 62a-correspondingly mirrored.

The connection of the first individual mat 44a and the second individual mat 44b can be carried out in the same way in all three exemplary embodiments 42-1, 42-2, 42-3 of the coil mat 42 and applies to both three-phase and multi-phase electric machines. If the two individual mats 44a, 44b are connected in series, the connection effort can be clearly minimized by the mirrored design of the last half winding head 30, which has just been explained with reference to FIG. 29. FIGS. 30 to 33 show that the conductor ends thus exit in pairs and can be connected to each other without additional connection elements. FIG. 30 shows the rear view of the wound coil mat 42, which is formed from wave winding wires 24a-24f using the same coil step (see FIGS. 16 to 20), and shows in particular the interconnected coil winding 20 with uniform coil step formed from it. The series connection 108 is shown, with the exits 106 of a single mat 44b mirrored. Phase exits 110 and star points 112 are also shown.

Figure 31:
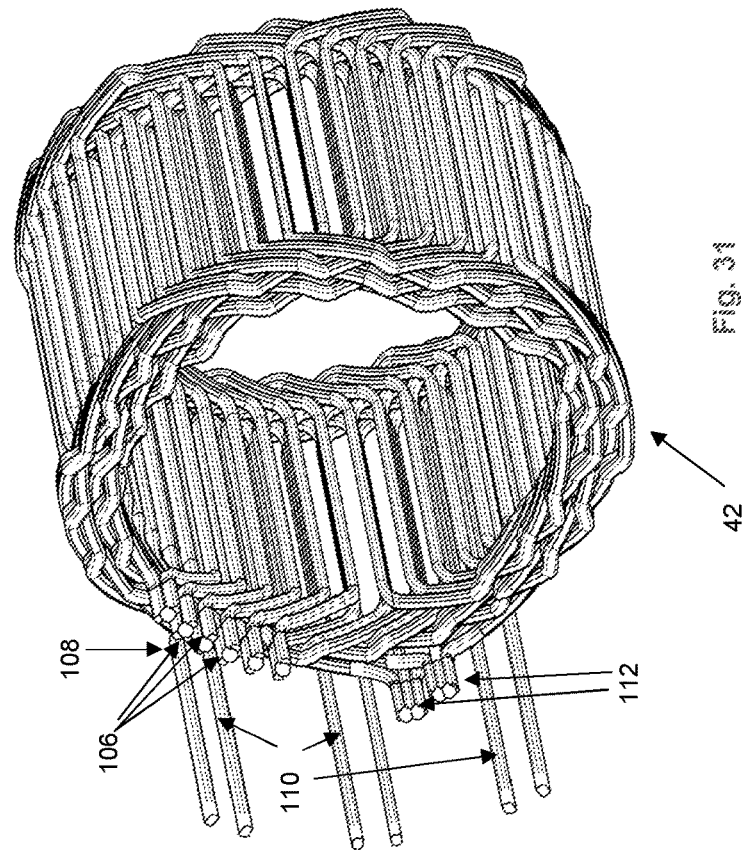
FIG. 31 is a perspective view, similar to FIG. 30, of a connected coil winding formed from a coil mat with an alternating coil step.

FIG. 31 shows the rear view of the coil mat 42 with alternating coil step (see FIGS. 1, 5 to 12 and 21) and in particular the connected coil winding 20 with alternating coil step formed from it. The series connection 108, the phase outlets 110 and the star points 112 are also shown here.

Figure 32:
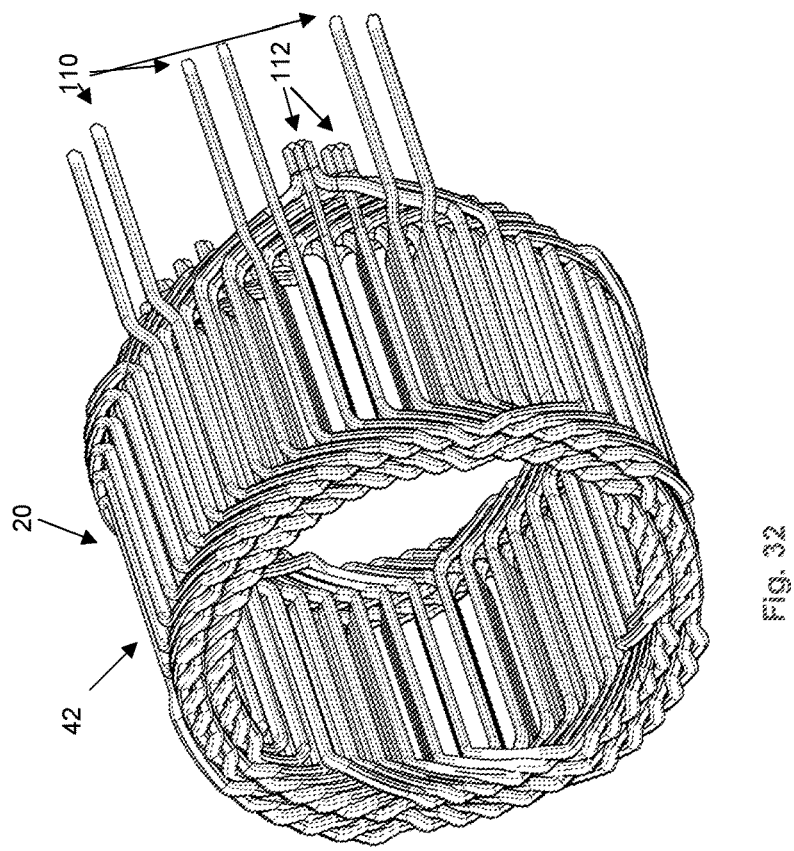
FIG. 32 is a second perspective view of the interconnected coil winding formed from a coil mat with a uniform coil step.
Figure 33:
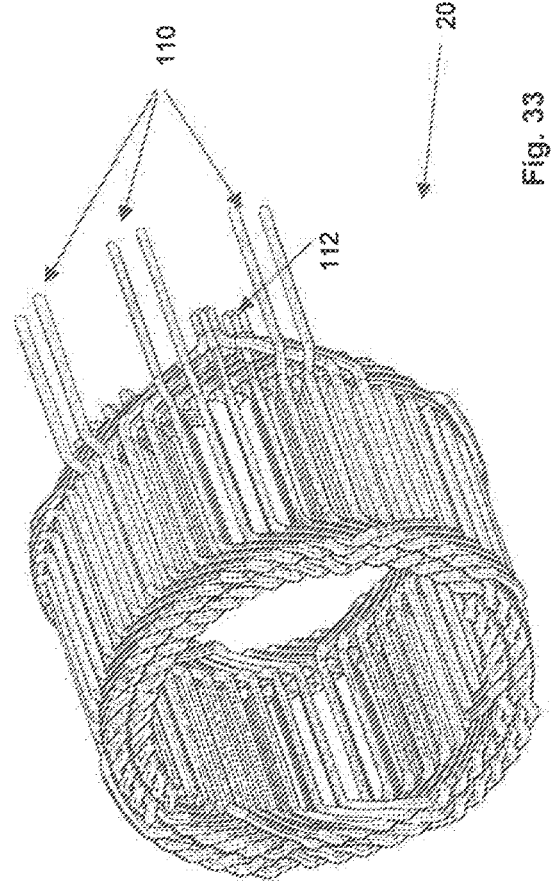
FIG. 33 is a second perspective view, similar to FIG. 32, of the interconnected coil winding formed from the coil mat with an alternating coil step.
Figure 35:
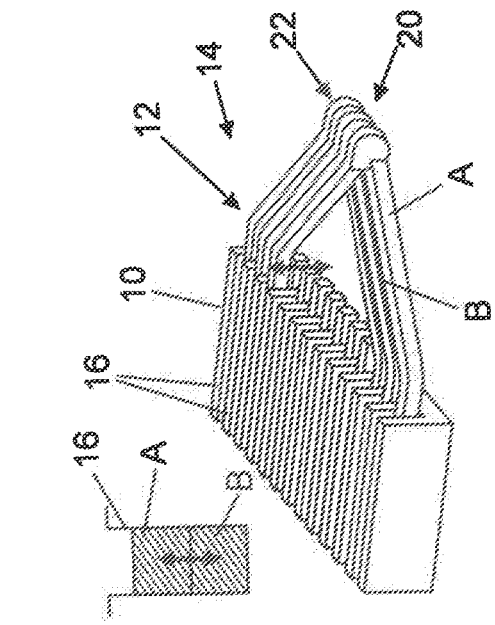
FIG. 35 is a representation, similar to FIG. 34, of the housing of the explanatory component, with the coil winding shown as a two-layer winding with a jump in the winding heads.
Figure 34:
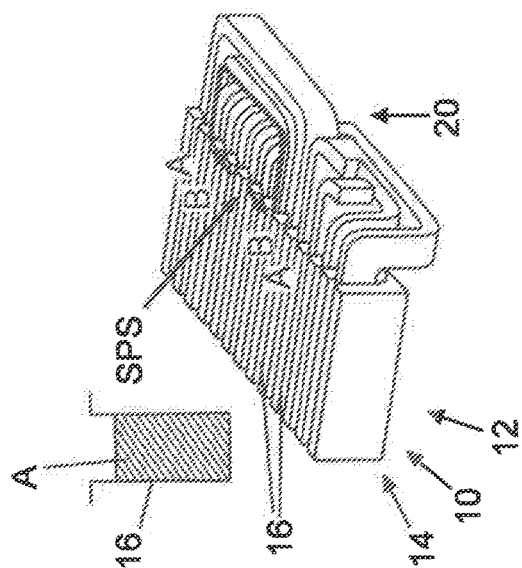
FIG. 34 is a simplified representation of a segment of an explanatory component of an electrical machine, e.g., a stator, comprising a housing provided with slots, with a coil winding which is inserted into the slots and designed as a single-layer winding.

FIG. 32 shows the front view of the connected coil winding 20 with uniform coil step and FIG. 33 shows the front view of the connected coil winding 20 with alternating coil step.

With an alternating coil step, coil winding 20 can be connected in alternating coil step, or an even coil step can be performed at the connection point. The respective other ends of the conductors can be connected to the star point (or several star points) and/or the phase outlets, depending on the star or delta connection. Potential equalization is achieved by connecting the two individual mats 44a, 44b in series.

Preferred configurations of the invention relate to a winding mat designed as a flat winding and to a coil mat formed from it for producing a coil winding for an electric machine. In order to be able to produce different coil mats automatically in large series with high reliability even with layer and conductor swap, it is proposed that wave winding wires be combined into the wave mat by a plugging. For manufacturing the coil mat, it is proposed among other things that two individual mats be joined by plugging.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 1 first winding head shape
2 second winding head shape
3 third winding head shape
4 fourth winding head shape
5 fifth winding head shape
6 sixth winding head shape
10 housing
12 component
14 stator
16 slot
20 coil winding
22 jump
24 wave winding wire
24a first wave winding wire
24b second wave winding wire
24c third wave winding wire
24d fourth wave winding wire
24e fifth wave winding wire
24f sixth wave winding wire
26 wave section
28 straight wire section
30 winding head
30a first winding head
30b second winding head
32a first half-wave section
32b second half-wave section
34a first bend point
35b second bend point
34c third bend point
36 connecting section
38a first height offset
38b second height offset
38c third height offset
40 winding mat
42 coil mat
42-1 first exemplary embodiment of coil mat
42-2 second exemplary embodiment of coil mat
42-3 third exemplary embodiment of coil mat
44a first individual mat
44b second individual mat
46 start region
48 end region
50 flat mat
52 transition region
54 stair-shaped mat
56 standard region
58 roof bend
60a first transition bend
60b second transition bend
62a first winding head section
62b second winding head section
62c third winding head section
64 counter-bend
66 wave winding wire supply device
68 wave winding wire manufacturing device
70 winding head shaping device
72 clamping device
74-1 first clamping unit
74-2 second clamping unit
74-3 third clamping unit
74-4 fourth clamping unit
74-5 fifth clamping unit
76a first clamping jaw
76b second clamping jaw
78a first bending jaw
78b second bending jaw
80 fixing section
82 shaping portion
84 bending die
86 bending radius
88-1a actuator for first clamping jaw of first clamping unit
88-1b actuator for second clamping jaw of first clamping unit
88-2a actuator for first clamping jaw of second clamping unit
88-2b actuator for second clamping jaw of second clamping unit
88-3a actuator for first clamping jaw of third clamping unit
88-3b actuator for second clamping jaw of third clamping unit
88-4a actuator for first clamping jaw of fourth clamping unit
88-4b actuator for second clamping jaw of fourth clamping unit
88-5a actuator for first clamping jaw of fifth clamping unit
88-5b actuator for second clamping jaw of fifth clamping unit
90 control system
92-1 first clamping surface
92-2 second clamping surface
92-3 third clamping surface
94 bending unit
96 carriage
98-1a first sub-section of first wave winding wire
98-2a second sub-section of first wave winding wire
98-1b first sub-section of second wave winding wire
98-2b second sub-section of second wave winding wire
100 crossover point
102-1a first sub-section of first individual mat
102-2a second sub-section of first individual mat
102-1b first sub-section of second individual mat
102-2b second sub-section of second individual mat
104 regular exit
106 mirrored exit
108 series connection
110 phase exits
112 star points
A first conductor
B second conductor
HM height extension dimension HR1 first height direction
HR2 second height direction
K1 position adjacent to cross-plugging position
K2 cross-plugging position
K3 position adjacent to cross-plugging position
KLM no layer swap possible
LM layer swap possible
OF upper surface
UF lower surface
SA stator outer side
SI stator inner side
SPS coil step
STP stacking
STK plugging
WKH winding head height

The invention claimed is:

1. A winding mat for forming a coil winding of a component of an electric machine, comprising
several wave winding wires extending in a longitudinal direction and bent in a wave shape, said wave winding wires having
straight wire sections spaced apart in the longitudinal direction and extending in a transverse direction running transversely to the longitudinal direction, and
intermediate roof-shaped winding heads,
such that adjacent straight wire sections are connected to each other by a winding head bent in a roof-shaped manner to form a half-wave section, such that first half-wave sections with first winding heads bent in a first direction and second half-wave sections with second winding heads bent in an opposite second direction are alternately provided and a first half-wave section and an adjacent second half-wave section respectively form a wave section,
wherein the wave winding wires are not interlaced or twisted, but are joined together by plugging the wave winding wires together in the transverse direction to each other in such a way that in at least one insertion region of the winding mat, a first and an adjacent second sub-section of the one wave winding wire and a first and an adjacent second sub-section of the other wave winding wire are plugged into each other in such a way that the first sub-section of the one wave winding wire is plugged-in under the first sub-section of the other wave winding wire and the second sub-section of the one wave winding wire is plugged-in over the second sub-section of the other wave winding wire, wherein:
each wave winding wire has a wire thickness in the straight wire sections which, measured in a height direction running transversely to the longitudinal direction and transversely to the transverse direction, extends over a wire thickness dimension, and each winding head has a first height offset by half a height extension dimension at a first winding head section that connects to a first straight wire section, a second height offset by a full height extension dimension at a second winding head section that connects to the first winding head section, and a third height offset by half a height extension dimension at a third winding head section that extends between the second winding head section and a second straight wire section, the height extension dimension being equal to the wire thickness dimension or equal to the wire thickness dimension plus a predetermined tolerance,
wherein the winding mat optionally includes at least one of the following features:
at least one standard region is provided in which the first height offset at each winding head is directed in a first height direction, the second height offset is directed in the opposite second height direction, and the third height offset is directed in the first height direction; or
in a transition region of a winding mat wherein the winding mat is stepped in a stair-like manner with at least one transition region forming a step in the height direction, the transition region forming an insertion region, at least one winding head in which the first height offset is directed in the first height direction, the second height offset is directed in the first direction, and the third height offset is directed in the second direction, and at least one winding head in which the first height offset is directed in the second height direction, the second height offset is directed in the second height direction, and the third height offset is directed in the first height direction are respectively provided at the wave winding wires; or
in at least one of a start region or end region of the winding mat, at least one winding head is provided in each case at the wave winding wires, in which winding head
the first height offset is directed in the first height direction, the second height offset is directed in the second height direction, and the third height offset is directed in the first height direction, or
the first height offset is directed in the second height direction, the second height offset is directed in the first height direction, and the third height offset is directed in the first height direction; or
a radial extension of a winding mat wound up in n layers has a maximum value of (n+1) multiplied by the height extension dimension in a region of the winding heads.

2. The winding mat according to claim 1, wherein the winding mat is
configured to be flat with a uniform extension in a height direction over an entire length.

3. The winding mat according to claim 1, further comprising
at least two of the wave winding wires are plugged into each other at at least one of the start region of the winding mat or the end region of the winding mat and are stacked in at least one intermediate region.

4. A component of an electric machine, comprising a component body and coil winding supported thereon which is formed by a winding mat wound up in several layers, according to claim 1.

5. The component according to claim 4, wherein at least one of:
the component is configured as a stator, wherein the component body is an annular housing with radial slots, in which housing the straight wire sections are accommodated; or
a radial extension of the winding mat wound up in n layers or of a coil mat has a maximum value of (n+1) multiplied by the height extension dimension in the region of the winding heads.

6. A coil mat for forming a coil winding of a component of an electric machine, the coil mat comprising a first individual mat having 3n1 individual wave winding wires, where n1 is a natural number greater than 0, and a second individual mat having 3n2 individual wave winding wires, where n2 is a natural number greater than 0, the wave winding wires comprising straight wire sections spaced apart in the longitudinal direction of the coil mat and extending in a transverse direction running transversely to the longitudinal direction, and intermediate roof-shaped winding heads such that adjacent straight wire sections are connected to each other by a winding head bent in a roof-shaped manner and thus form half-wave sections such that first half-wave sections with first winding heads bent in a first direction and second half-wave sections with second winding heads bent in an opposite direction are alternately provided and a first half-wave section and an adjacent second half-wave section respectively form a wave section, wherein the individual mats are not interlaced or twisted, but are joined together by plugging the individual mats into each other in the transverse direction to each other in such a way that a first and an adjacent second sub-section of the first individual mat and a first and an adjacent second sub-section of the second individual mat are plugged into each other in such a way that the first sub-section of the first individual mat is plugged-in under the first sub-section of said second individual mat and the second sub-section of the first individual mat is plugged-in over the second sub-section of the second individual mat at at least one insertion region of the coil mat, wherein each wave winding wire has a wire thickness in the straight wire sections which, measured in a height direction running transversely to the longitudinal direction and transversely to the transverse direction, extends over a wire thickness dimension, and each winding head has a first height offset by half a height extension dimension at a first winding head section that connects to a first straight wire section, a second height offset by a full height extension dimension at a second winding head section that connects to the first winding head section, and a third height offset by half a height extension dimension at a third winding head section that extends between the second winding head section and the second straight wire section, the height extension dimension being equal to the wire thickness dimension or equal to the wire thickness dimension plus a predetermined tolerance.

7. The coil mat according to claim 6, wherein the individual mats are stepped in a stair-like manner, with at least one transition region which forms a step in the height direction, the coil mat has a start region, several standard regions with a respective intermediate transition region, and an end region, when the coil mat is used as intended, a first height direction in height offsets of the winding heads corresponds to a direction radially outwards and a second height direction corresponds to a direction radially inwards, the winding heads have a winding head shape which is selected from a group of winding head shapes comprising:

a first winding head shape where a first height offset is directed in the second height direction, a second height offset is directed in the first height direction and a third height offset is directed in the second height direction, a second winding head shape where a first height offset is directed in the first height direction, a second height offset is directed in the second height direction and a third height offset is directed in the first height direction, a third winding head shape where a first height offset is directed in the first height direction, a second height offset is directed in the first height direction and a third height offset is directed in the second height direction, a fourth winding head shape where a first height offset is directed in the first height direction, a second height offset is directed in the second height direction and a third height offset is directed in the second height direction, a fifth winding head shape where a first height offset is directed in the second height direction, a second height offset is directed in the first height direction and a third height offset is directed in the first height direction; and a sixth winding head shape where a first height offset is directed in the second height direction, a second height offset is directed in the second height direction and a third height offset is directed in the first height direction, and wherein in standard regions, winding heads with the first or the second winding head shape are provided and at least some of the wave winding wires in the transition region have winding heads with at least one of the third, the fourth, the fifth, or the sixth winding head shape.

8. The coil mat according to claim 7, wherein the first and the second individual mats are stacked on one another and wherein in the first individual mat, in the start region and in the standard regions, the winding heads have the second winding head shape;

in the transition region, the winding heads of at least one wave winding wire or group of wave winding wires have the fourth winding head shape and the winding heads of at least one other wave winding wire or group of wave winding wires have the sixth wave winding shape; and at the end region, the winding heads of the at least one wave winding wire or group of wave winding wires have the fourth winding head shape; and in the second individual mat:

in the start region, the winding heads of at least one wave winding wire or group of wave winding wires have the fourth winding head shape;

in the standard regions as well as in the end region, the winding heads have the first winding head shape; and in the transition region, the winding heads of the at least one wave winding wire or group of wave winding wires have the fourth winding head shape and the winding heads of at least one other wave winding wire or group of wave winding wires have the sixth wave winding shape; or in the first individual mat, in the start region and in the standard regions, the winding heads have the first winding head shape;

in the transition region, the winding heads of at least one wave winding wire or group of wave winding wires have the fifth winding head shape and the winding heads of at least one other wave winding wire or group of wave winding wires have the third wave winding shape; and at the end region, the winding heads of the at least one wave winding wire or group of wave winding wires have the fifth winding head shape; and in the second individual mat,
- in the start region, the winding heads of at least one wave winding wire or group of wave winding wires have the fifth winding head shape;
- in the standard regions as well as in the end region, the winding heads have the second winding head shape; and
- in the transition region, the winding heads of the at least one wave winding wire or group of wave winding wires have the fifth winding head shape and the winding heads of at least one other wave winding wire or group of wave winding wires have the third wave winding shape; or in the first individual mat,
- in the start region and in the standard regions, the winding heads have the first winding head shape;
- in the transition region, the winding heads of at least one wave winding wire or group of wave winding wires have the sixth winding head shape and the winding heads of at least one other wave winding wire or group of wave winding wires have the fourth wave winding shape; and
- at the end region, the winding heads of the at least one wave winding wire or group of wave winding wires have the sixth winding head shape; and in the second individual mat,
- in the start region, the winding heads of at least one wave winding wire or group of wave winding wires have the sixth winding head shape;
- in the standard regions as well as in the end region, the winding heads have the second winding head shape; and in the transition region, the winding heads of the at least one wave winding wire or group of wave winding wires have the sixth winding head shape and the winding heads of at least one other wave winding wire or group of wave winding wires have the fourth wave winding shape; or in the first individual mat,
- in the start region and in the standard regions, the winding heads have the second winding head shape;
- in the transition region, the winding heads of at least one wave winding wire or group of wave winding wires have the third winding head shape and the winding heads of at least one other wave winding wire or group of wave winding wires have the fifth wave winding shape; and
- at the end region, the winding heads of the at least one wave winding wire or group of wave winding wires have the third winding head shape; and in the second individual mat,
- in the start region, the winding heads of at least one wave winding wire or group of wave winding wires have the third winding head shape;
- in the standard regions as well as in the end region, the winding heads have the first winding head shape; and
- in the transition region, the winding heads of the at least one wave winding wire or group of wave winding wires have the third winding head shape and the winding heads of at least one other wave winding wire or group of wave winding wires have the fifth wave winding shape.

9. The coil mat according to claim 7, wherein
both the first individual mat and the second individual mat are winding mats for forming a coil winding of a component of an electric machine, comprising
several wave winding wires extending in a longitudinal direction and bent in a wave shape, said wave winding wires having
- straight wire sections spaced apart in the longitudinal direction and extending in a transverse direction running transversely to the longitudinal direction, and
- intermediate roof-shaped winding heads,
- such that adjacent straight wire sections are connected to each other by a winding head bent in a roof-shaped manner to form a half-wave section, such that first half-wave sections with first winding heads bent in a first direction and second half-wave sections with second winding heads bent in an opposite second direction are alternately provided and a first half-wave section and an adjacent second half-wave section respectively form a wave section, wherein the wave winding wires are not interlaced or twisted, but are joined together by plugging the wave winding wires together in the transverse direction to each other in such a way that in at least one insertion region of the winding mat, a first and an adjacent second sub-section of the one wave winding wire and a first and an adjacent second sub-section of the other wave winding wire are plugged into each other in such a way that the first sub-section of the one wave winding wire is plugged-in under the first sub-section of the other wave winding wire and the second sub-section of the one wave winding wire is plugged-in over the second sub-section of the other wave winding wire, the first and the second individual winding mats are not interlaced or twisted, but are joined together by plugging the individual mats into each other in the transverse direction to each other in such a way that a first and an adjacent second sub-section of the one individual mat and a first and an adjacent second sub-section of the other individual mat are plugged into each other in such a way that the first sub-section of the one individual mat is plugged-in under the first sub-section of said other individual mat and the second sub-section of the one individual mat is plugged-in over the second sub-section of the other individual mat at at least one insertion region of the coil mat are plugged into each other; and wherein in the first individual mat,
- in the start region, the winding heads of at least one or each wave winding wire of a group of wave winding wires have the sixth winding head shape;
- in the standard regions, the winding heads have the second winding head shape;
- in the transition region, the winding heads of the at least one wave winding wire or group of wave winding wires comprise a sequence of at least one third and at least two sixth winding head shapes and the winding heads of at least one other wave winding wire or group of wave winding wires comprise a sequence of at least one first and at least one fourth wave winding shape; and
- at the end region, the winding heads of the at least one wave winding wire or group of wave winding wires comprise a sequence of one third and at least one sixth winding head shape; and in the second individual mat,
- in the start region, the winding heads of at least one wave winding wire or group of wave winding wires have the sixth winding head shape and the winding heads of another wave winding wire or group of wave winding wires have the third winding head shape;

in the standard regions, the winding heads have the first winding head shape; and in the transition region, the winding heads of the at least one wave winding wire or group of wave winding wires comprise a sequence of at least one second and at least one sixth winding head shape and the winding heads of at least one other wave winding wire or group of wave winding wires comprise a sequence of at least one sixth, at least one fourth and at least one third winding head shape; and in the end region, the winding heads of the at least one wave winding wire or group of wave winding wires have the second winding head shape and the winding heads of the other wave winding wire or group of wave winding wires have the sixth winding head shape; or in the first individual mat, in the start region, the winding heads of at least one wave winding wire or each wave winding wire of a group of wave winding wires have the third winding head shape;

in the standard regions, the winding heads have the first winding head shape;

in the transition region, the winding heads of the at least one wave winding wire or group of wave winding wires comprise a sequence of at least one sixth and at least two third winding head shapes and the winding heads of at least one other wave winding wire or group of wave winding wires comprise a sequence of at least one second and at least one fifth wave winding head shape; and at the end region, the winding heads of the at least one wave winding wire or group of wave winding wires comprise a sequence of at least one sixth and at least one third winding head shape; and in the second individual mat, in the start region, the winding heads of at least one wave winding wire or group of wave winding wires have the third winding head shape and the winding heads of another wave winding wire or group of wave winding wires have the sixth winding head shape;

in the standard regions, the winding heads have the second winding head shape;

in the transition region, the winding heads of the at least one wave winding wire or group of wave winding wires comprise a sequence of at least one first and at least one third winding head shape and the winding heads of at least one other wave winding wire or group of wave winding wires comprise a sequence of at least one third, at least one fifth and at least one sixth winding head shape; and in the end region, the winding heads of said one wave winding wire or group of wave winding wires have the first winding head shape and the winding heads of the other wave winding wire or group of wave winding wires have the third winding head shape.

10. The coil mat according to claim 6, wherein the sub-sections of the individual mats plugged into each other are offset in height to each other when the individual mats are not interlaced or twisted, but are joined together by plugging the individual mats into each other in the transverse direction to each other in such that the first and the adjacent second sub-section of the first individual mat and the first and the adjacent second sub-section of the second individual mat are plugged into each other such that the first sub-section of the first individual mat is plugged-in under the first sub-section of said second individual mat and the second sub-section of the first individual mat is plugged-in over the second sub-section of the second individual mat at at least one insertion region of the coil mat.

11. A component of an electric machine, comprising a component body and coil winding supported thereon which is formed by a coil mat according to claim 6.

* * * * *